(12) United States Patent
Mitsutani

(10) Patent No.: US 11,248,502 B2
(45) Date of Patent: Feb. 15, 2022

(54) HYDRAULIC OIL CONTROL VALVE AND VALVE TIMING ADJUSTMENT DEVICE

(71) Applicant: DENSO CORPORATION, Kariya (JP)

(72) Inventor: Tetsuro Mitsutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 16/542,460

(22) Filed: Aug. 16, 2019

(65) Prior Publication Data

US 2019/0368387 A1 Dec. 5, 2019

Related U.S. Application Data

(63) Continuation of application No. PCT/JP2018/008200, filed on Mar. 5, 2018.

(30) Foreign Application Priority Data

Mar. 7, 2017 (JP) .............................. JP2017-42607

(51) Int. Cl.
*F01L 1/344* (2006.01)
*F16K 11/07* (2006.01)
*F16K 15/18* (2006.01)

(52) U.S. Cl.
CPC ........ *F01L 1/3442* (2013.01); *F16K 11/0712* (2013.01); *F16K 15/1825* (2021.08)

(58) Field of Classification Search
CPC ... F01L 1/3442; F16K 11/0712; F16K 15/185

(Continued)

(56) References Cited

U.S. PATENT DOCUMENTS 4,832,081 A * 5/1989 Amrhein .................. F16K 3/26
 137/625.26
6,899,126 B2 * 5/2005 Weigand ............... F01L 1/3442
 137/512.15

(Continued)

FOREIGN PATENT DOCUMENTS

JP S50-106723 9/1975
JP S57-93670 6/1982

(Continued)

OTHER PUBLICATIONS

U.S. Appl. No. 16/502,333 of Mitsutani, filed Jul. 3, 2019 (57 pages).

(Continued)

*Primary Examiner* — David Hamaoui
*Assistant Examiner* — John D Bailey
(74) *Attorney, Agent, or Firm* — Nixon & Vanderhye P.C.

(57) ABSTRACT

A supply passage extends through an inner sleeve in a radial direction and conducts hydraulic oil received from a hydraulic oil supply source. An axial passage is located between an outer sleeve and the inner sleeve and extends in an axial direction. The supply passage opens to one end portion of the axial passage while another end portion of the axial passage is configured to connect with a valve timing adjustment device. A supply check valve is installed in the axial passage and is located on a radial side of the supply passage where a radially outer side of the inner sleeve is placed. The supply check valve enables a flow of the hydraulic oil from the supply passage toward the axial passage and limits a flow of the hydraulic oil from the axial passage toward the supply passage.

17 Claims, 19 Drawing Sheets

(58) Field of Classification Search
USPC .................................................. 123/196 V
See application file for complete search history.

(56) References Cited

U.S. PATENT DOCUMENTS

| | | | | |
|---|---|---|---|---|
| 7,000,580 | B1* | 2/2006 | Smith | F01L 1/3442 |
| | | | | 123/90.17 |
| 7,600,531 | B2* | 10/2009 | Patze | F16K 15/16 |
| | | | | 137/512.15 |
| 8,505,582 | B2* | 8/2013 | Gautier | F01L 1/3442 |
| | | | | 137/625.68 |
| 9,074,694 | B2* | 7/2015 | Hoppe | F16K 17/00 |
| 9,797,276 | B2* | 10/2017 | Tewes | F01L 1/3442 |
| 10,260,384 | B2* | 4/2019 | Mitsutani | F01L 1/3442 |
| 10,273,835 | B2* | 4/2019 | Kajita | F01L 1/3442 |
| 2007/0095315 | A1* | 5/2007 | Hoppe | F15B 13/0402 |
| | | | | 123/90.17 |
| 2008/0240928 | A1* | 10/2008 | Wang | F04B 27/1018 |
| | | | | 417/26 |
| 2009/0145386 | A1* | 6/2009 | Ushida | F01L 1/3442 |
| | | | | 123/90.17 |
| 2009/0159024 | A1* | 6/2009 | Paul | F01L 1/3442 |
| | | | | 123/90.15 |
| 2015/0129069 | A1* | 5/2015 | Bayrakdar | F01L 1/344 |
| | | | | 137/625.35 |
| 2015/0218977 | A1* | 8/2015 | Hofmann | F01L 1/3442 |
| | | | | 123/90.17 |
| 2015/0369092 | A1* | 12/2015 | Parker | F01L 1/3442 |
| | | | | 123/90.12 |
| 2016/0356187 | A1* | 12/2016 | Meneely | F01L 1/181 |
| 2017/0022854 | A1* | 1/2017 | Takada | F01L 1/047 |
| 2017/0198612 | A1* | 7/2017 | Noguchi | F01L 1/047 |
| 2018/0100595 | A1* | 4/2018 | Fanzani | F16K 27/0209 |
| 2018/0112563 | A1* | 4/2018 | Mitsutani | F01L 1/3442 |
| 2018/0156079 | A1* | 6/2018 | Yamakawa | F01L 1/3442 |
| 2018/0156080 | A1* | 6/2018 | Yamakawa | F01L 1/3442 |
| 2018/0245488 | A1* | 8/2018 | Hamasaki | F01L 1/022 |
| 2019/0323389 | A1* | 10/2019 | Mitsutani | F15B 15/12 |
| 2019/0323392 | A1* | 10/2019 | Mitsutani | F01L 1/344 |
| 2019/0353060 | A1* | 11/2019 | Amano | F16K 3/26 |

FOREIGN PATENT DOCUMENTS

| | | |
|---|---|---|
| JP | 2001-99341 | 4/2001 |
| JP | 2016-56851 | 4/2016 |
| WO | 2018/001405 | 1/2018 |
| WO | 2018/135573 | 7/2018 |
| WO | 2018/135577 | 7/2018 |
| WO | 2018/135586 | 7/2018 |
| WO | 2018/194076 | 10/2018 |

OTHER PUBLICATIONS

U.S. Appl. No. 16/502,361 of Mitsutani, filed Jul. 3, 2019 (52 pages).
U.S. Appl. No. 16/502,376 of Mitsutani, filed Jul. 3, 2019 (35 pages).
U.S. Appl. No. 16/502,404 of Mitsutani, et al. filed Jul. 3, 2019 (100 pages).
U.S. Appl. No. 16/555,122 of Mitsutani, filed Aug. 29, 2019 (61 pages).
U.S. Appl. No. 16/502,333, filed Jul. 3, 2019, Valve Timing Adjustment Device.
U.S. Appl. No. 16/502,361, filed Jul. 3, 2019, Valve Timing Adjustment Device.
U.S. Appl. No. 16/502,376, filed Jul. 3, 2019, Valve Timing Adjustment Device.
U.S. Appl. No. 16/502,404, filed Jul. 3, 2019, Valve Timing Adjustment Device and Check Valve.
U.S. Appl. No. 16/542,460, filed Aug. 16, 2019, Hydraulic Oil Control Valve and Valve Timing Adjustment Device.
U.S. Appl. No. 16/555,122, filed Aug. 29, 2019, Valve Timing Adjustment Device.

* cited by examiner

US 11,248,502 B2

1

HYDRAULIC OIL CONTROL VALVE AND VALVE TIMING ADJUSTMENT DEVICE

CROSS REFERENCE TO RELATED APPLICATIONS

This application is a continuation application of International Patent Application No. PCT/JP2018/008200 filed on Mar. 5, 2018, which designated the U.S. and claims the benefit of priority from Japanese Patent Application No. 2017-42607 filed on Mar. 7, 2017. The entire disclosures of all of the above applications are incorporated herein by reference.

TECHNICAL FIELD

The present disclosure relates to a hydraulic oil control valve and a valve timing adjustment device using the same.

BACKGROUND

Previously there is known a hydraulic oil control valve that controls a flow of hydraulic oil. In the hydraulic oil control valve, an inner sleeve is placed at an inside of an outer sleeve that is shaped in a tubular form, and a check valve, which is resiliently deformable in a radial direction, is placed at an annular space formed between the outer sleeve and the inner sleeve. The check valve controls a flow of the hydraulic oil between an outside of the outer sleeve and an inside of the inner sleeve.

SUMMARY

According to the present disclosure, there is provided a hydraulic oil control valve configured to control a flow of hydraulic oil to be supplied from a hydraulic oil supply source to a hydraulic oil supply subject. The hydraulic oil control valve includes an outer sleeve, an inner sleeve, a supply passage, an axial passage and a supply check valve. The supply passage extends through the inner sleeve or the outer sleeve in a radial direction. The supply passage is configured to conduct the hydraulic oil that is supplied from the hydraulic oil supply source. The axial passage is located between the outer sleeve and the inner sleeve. The supply passage opens to one end portion of the axial passage while another end portion of the axial passage is configured to connect with the hydraulic oil supply subject. The supply check valve is installed in the axial passage. The supply check valve is configured to enable a flow of the hydraulic oil from the supply passage toward the axial passage and is configured to limit a flow of the hydraulic oil from the axial passage toward the supply passage.

BRIEF DESCRIPTION OF DRAWINGS

The present disclosure, together with additional objectives, features and advantages thereof, will be best understood from the following description in view of the accompanying drawings.

2

Figure 4:
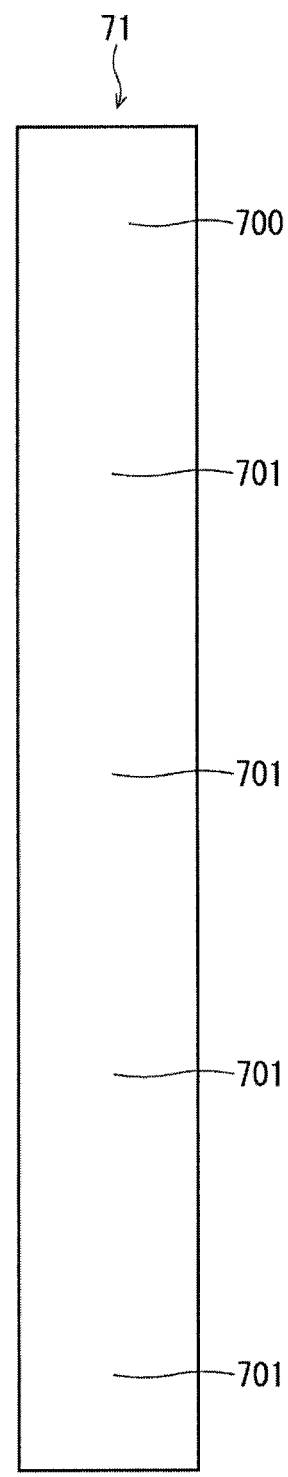

FIG. 4 is a developed view illustrating a supply check valve of the hydraulic oil control valve according to the first embodiment.

Figure 5:
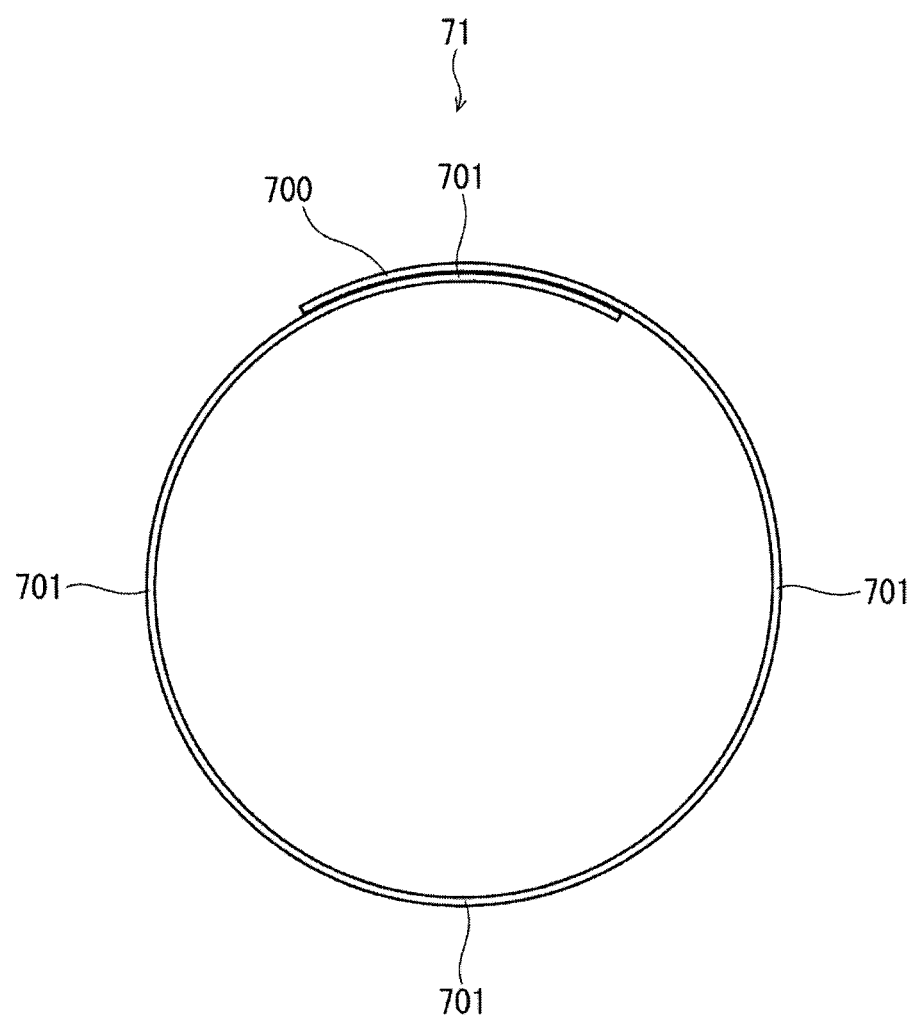

FIG. 5 is a view illustrating the supply check valve of the hydraulic oil control valve according to the first embodiment.

Figure 6:
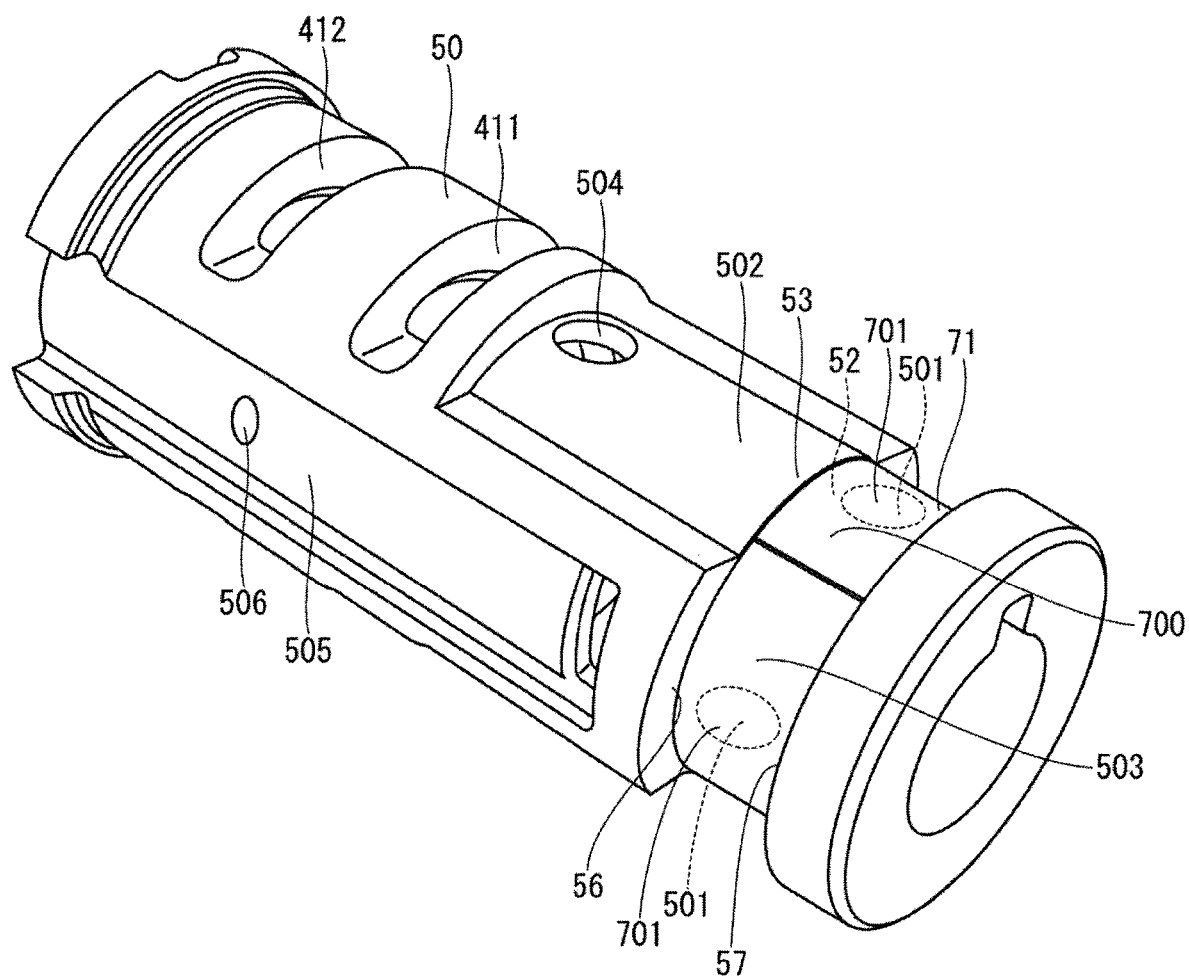

FIG. 6 is a perspective view illustrating an inner sleeve and the supply check valve of the hydraulic oil control valve according to the first embodiment.

Figure 7:
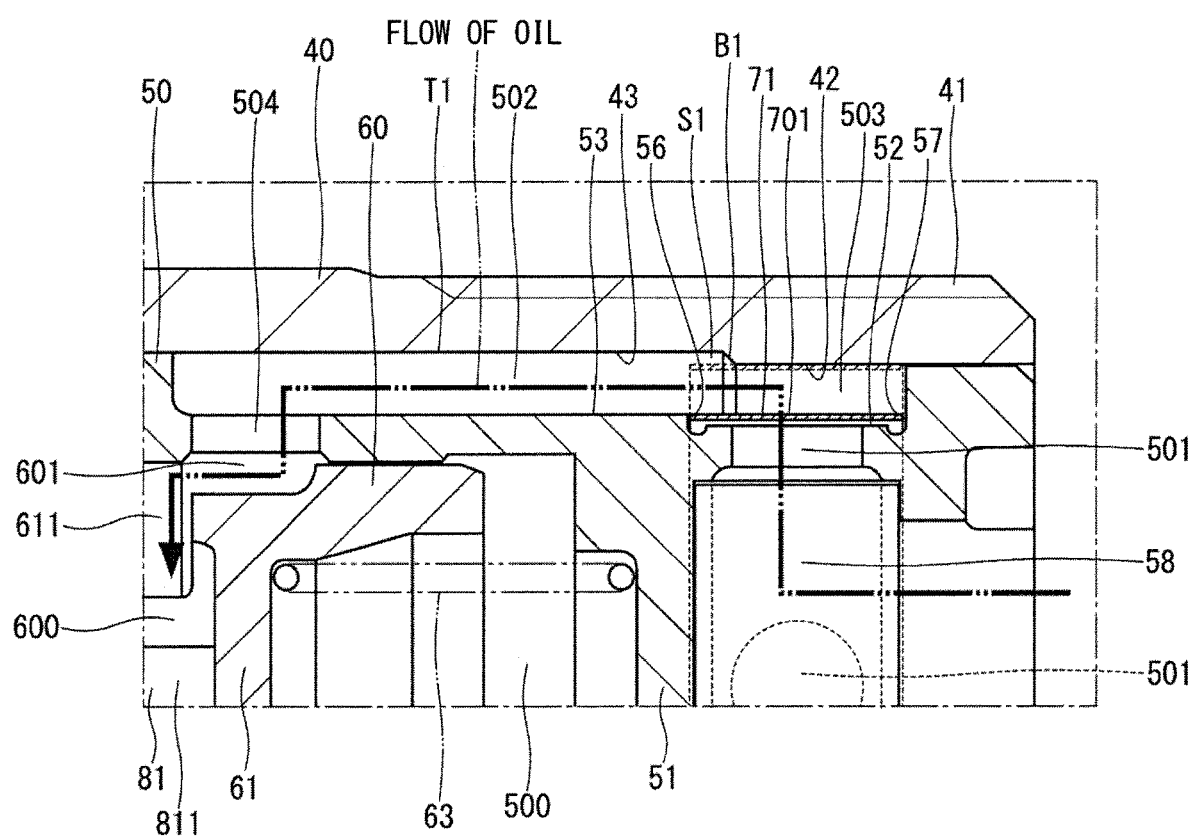

FIG. 7 is a view illustrating the supply check valve of the hydraulic oil control valve according to the first embodiment.

Figure 8:
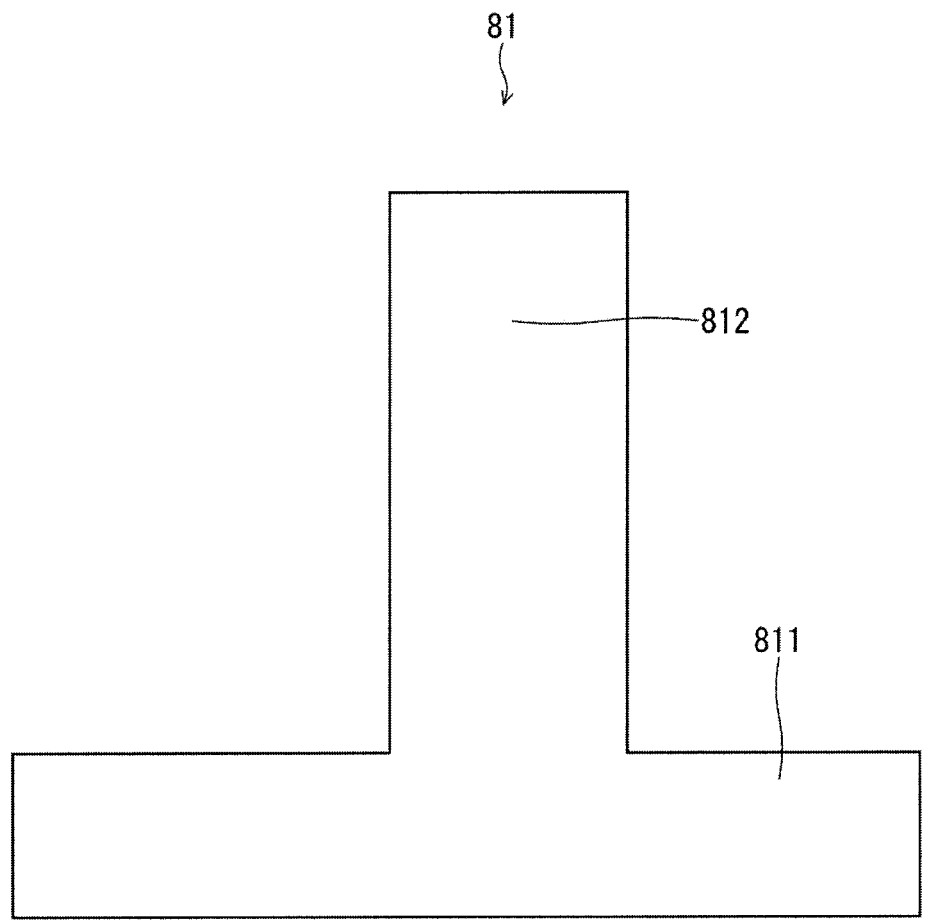

FIG. 8 is a developed view illustrating a recycle check valve of the hydraulic oil control valve according to the first embodiment.

Figure 9:
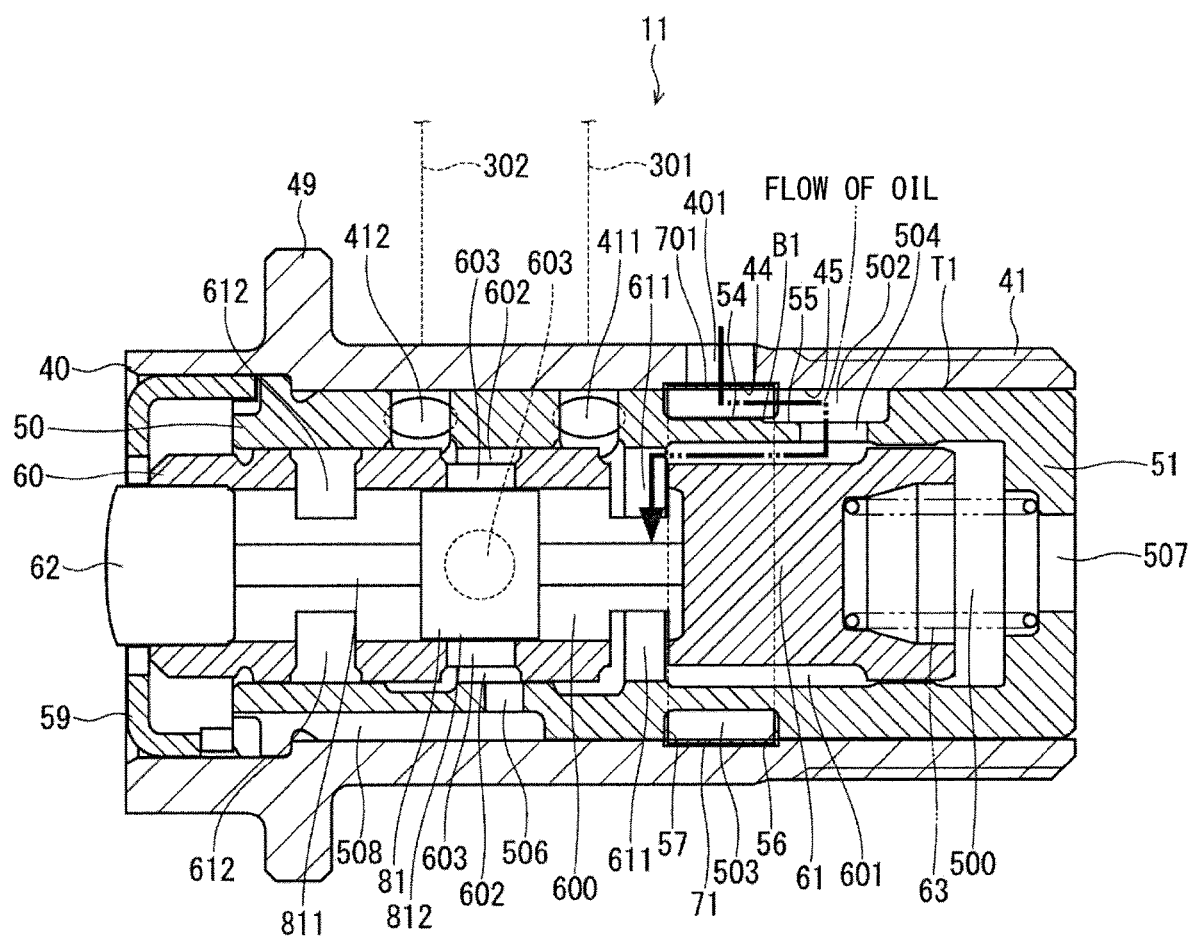

FIG. 9 is a cross-sectional view illustrating a hydraulic oil control valve according to a second embodiment.

Figure 10:
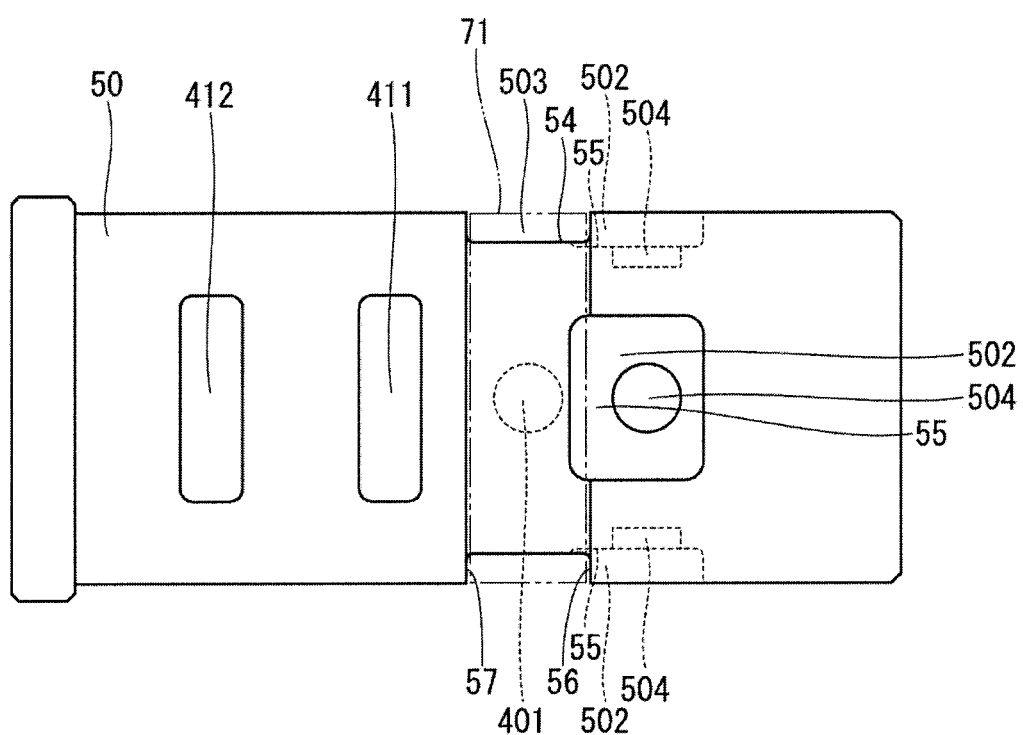

FIG. 10 is a plan view illustrating an inner sleeve of the hydraulic oil control valve according to the second embodiment.

Figure 11:
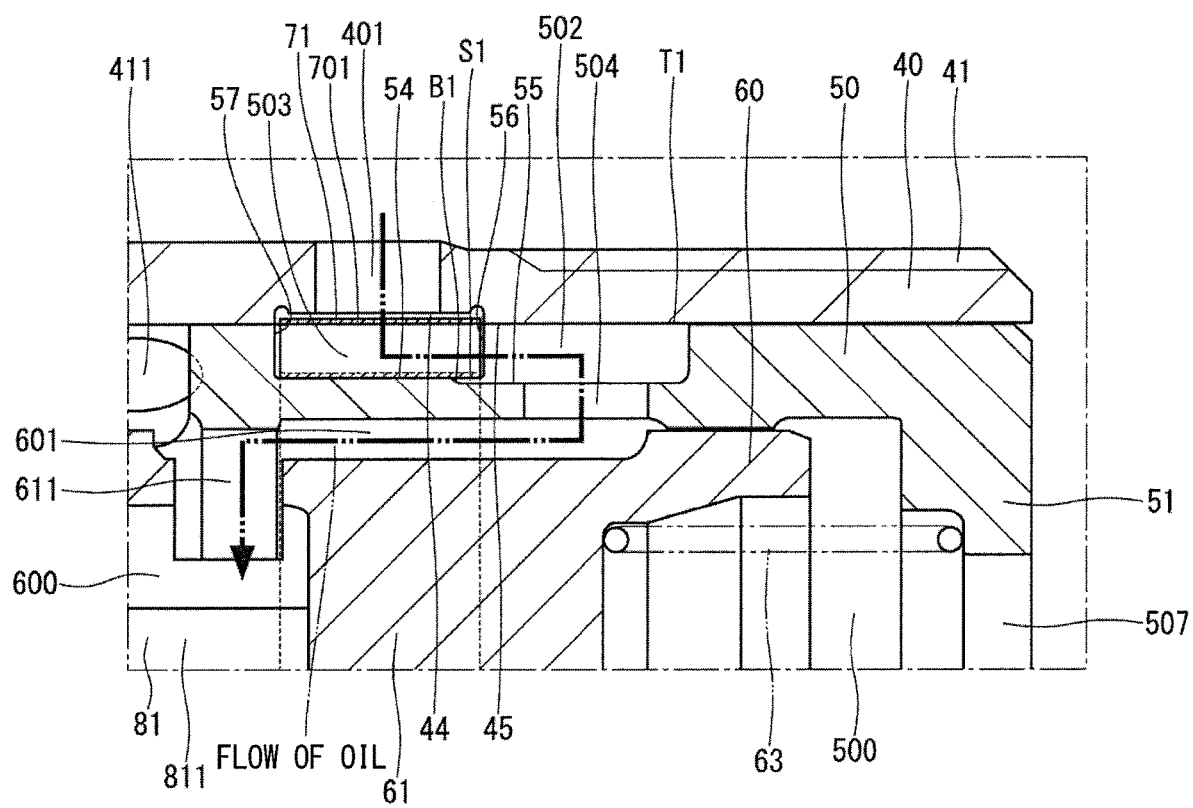

FIG. 11 is a cross-sectional view illustrating an area around a supply check valve of the hydraulic oil control valve according to the second embodiment.

Figure 12:
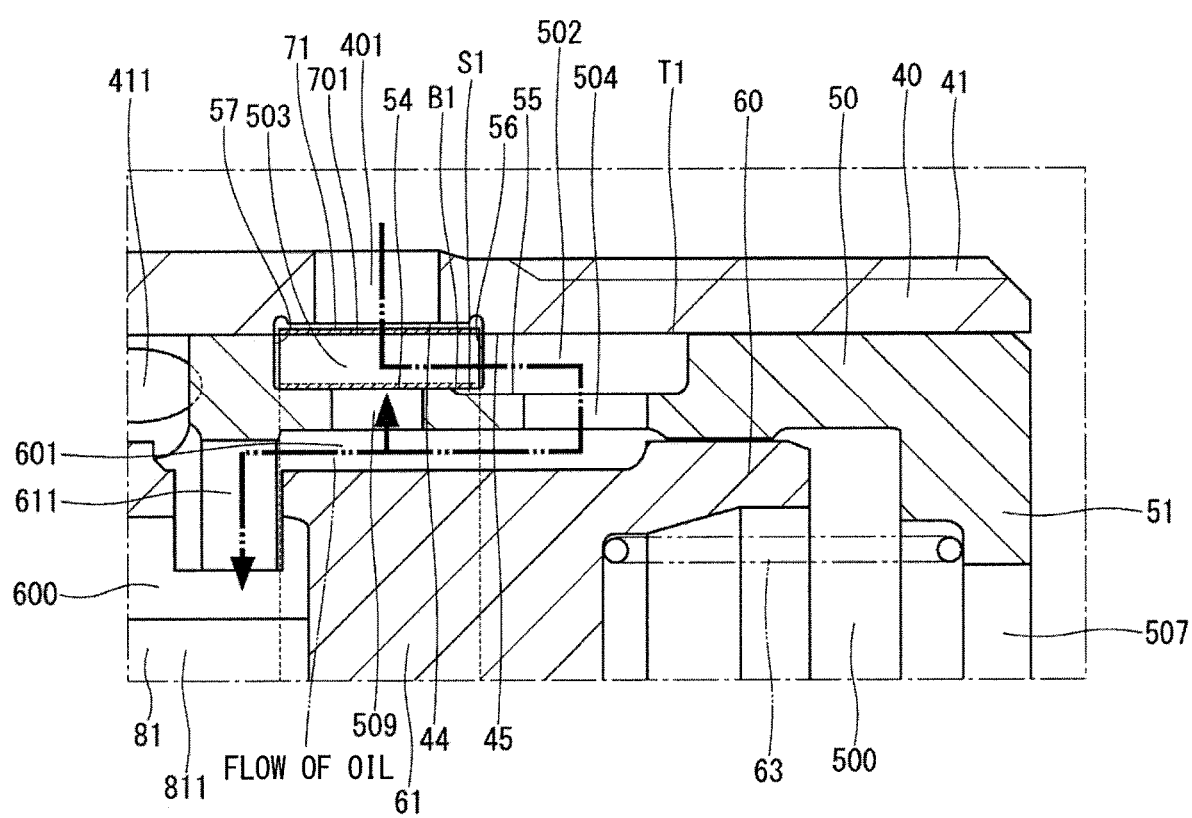

FIG. 12 is a cross-sectional view illustrating an area around a supply check valve of a hydraulic oil control valve according to a third embodiment.

Figure 13:
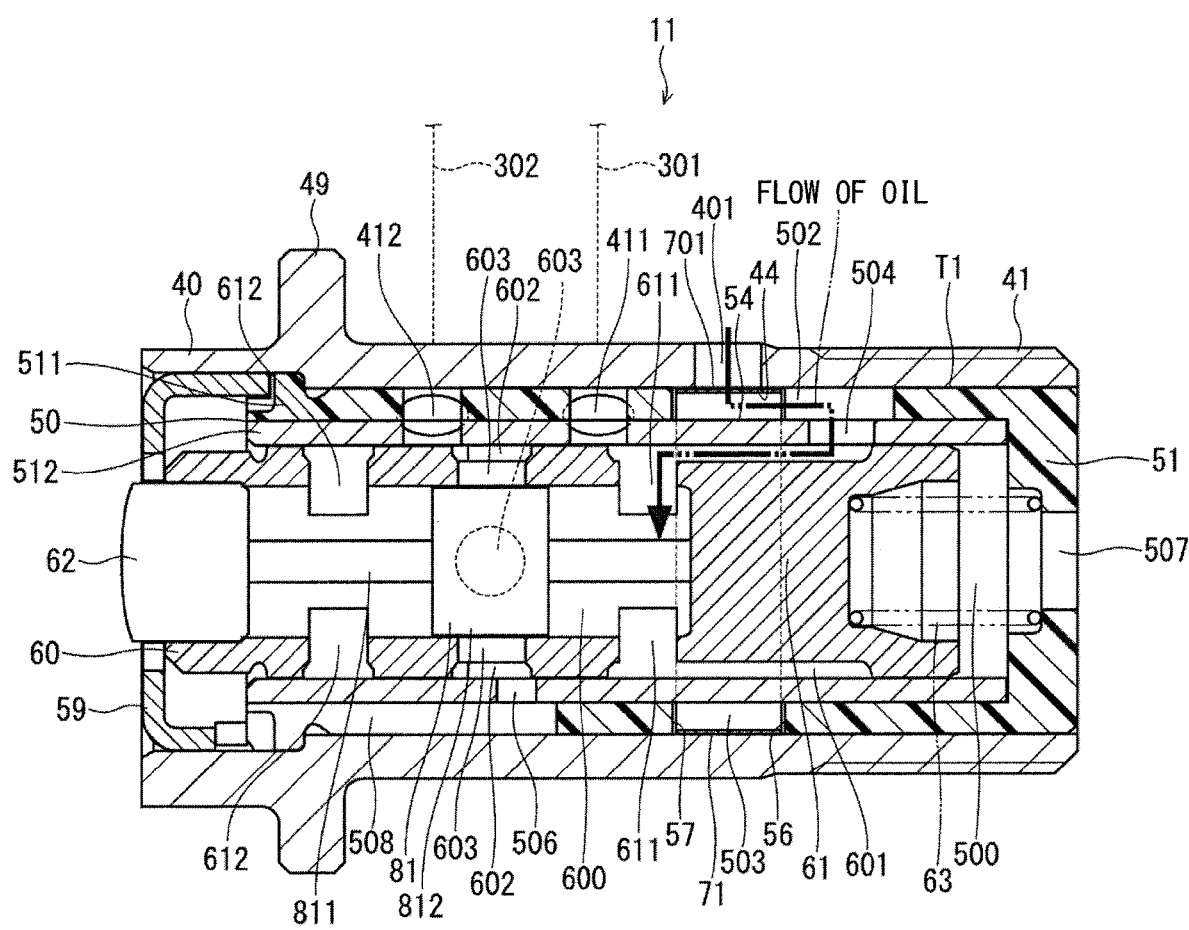

FIG. 13 is a cross-sectional view illustrating a hydraulic oil control valve according to a fourth embodiment.

Figure 14:
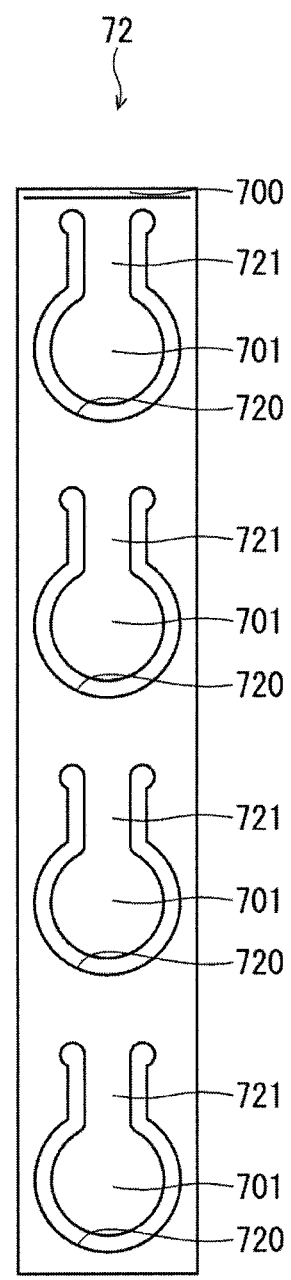

FIG. 14 is a developed view illustrating a supply check valve of a hydraulic oil control valve according to a fifth embodiment.

Figure 15:
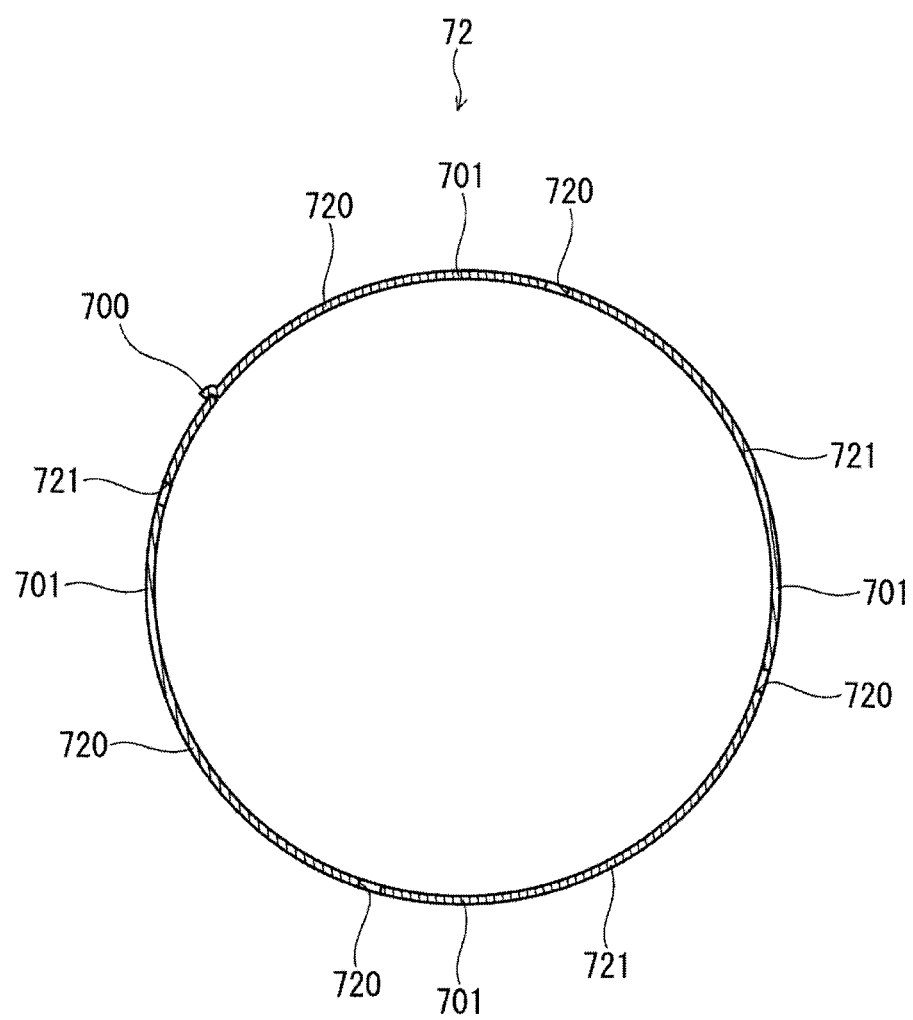

FIG. 15 is a cross-sectional view illustrating the supply check valve of the hydraulic oil control valve according to the fifth embodiment.

Figure 16:
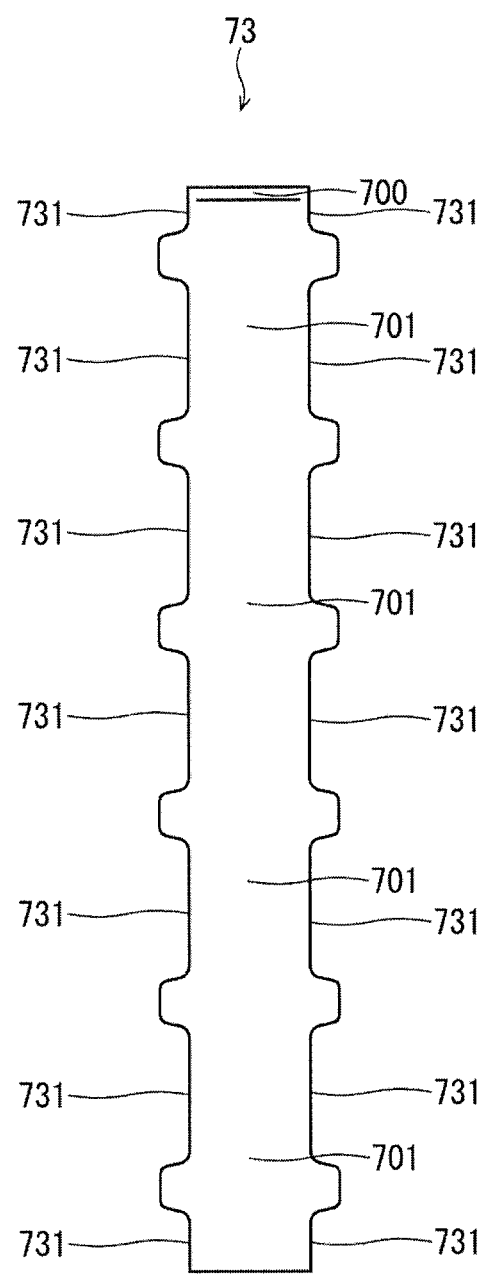

FIG. 16 is a developed view illustrating a supply check valve of a hydraulic oil control valve according to a sixth embodiment.

Figure 17:
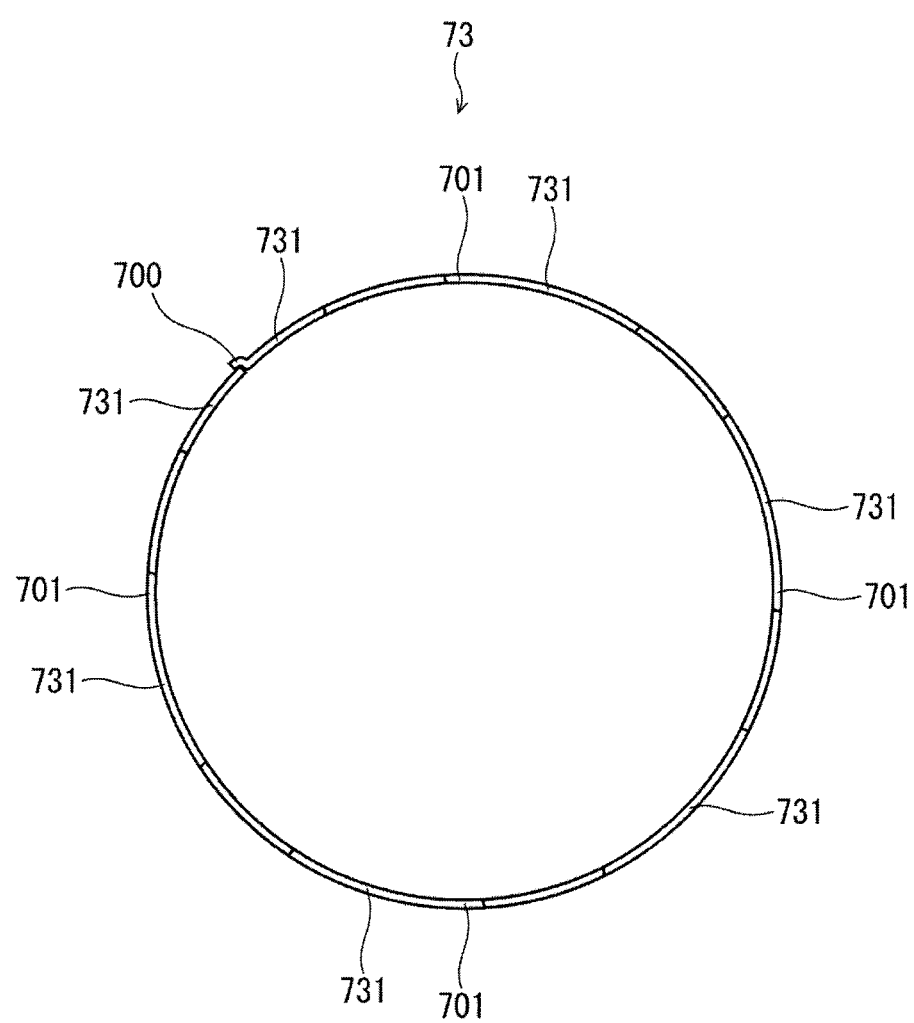

FIG. 17 is a view illustrating the supply check valve of the hydraulic oil control valve according to the sixth embodiment.

Figure 18:
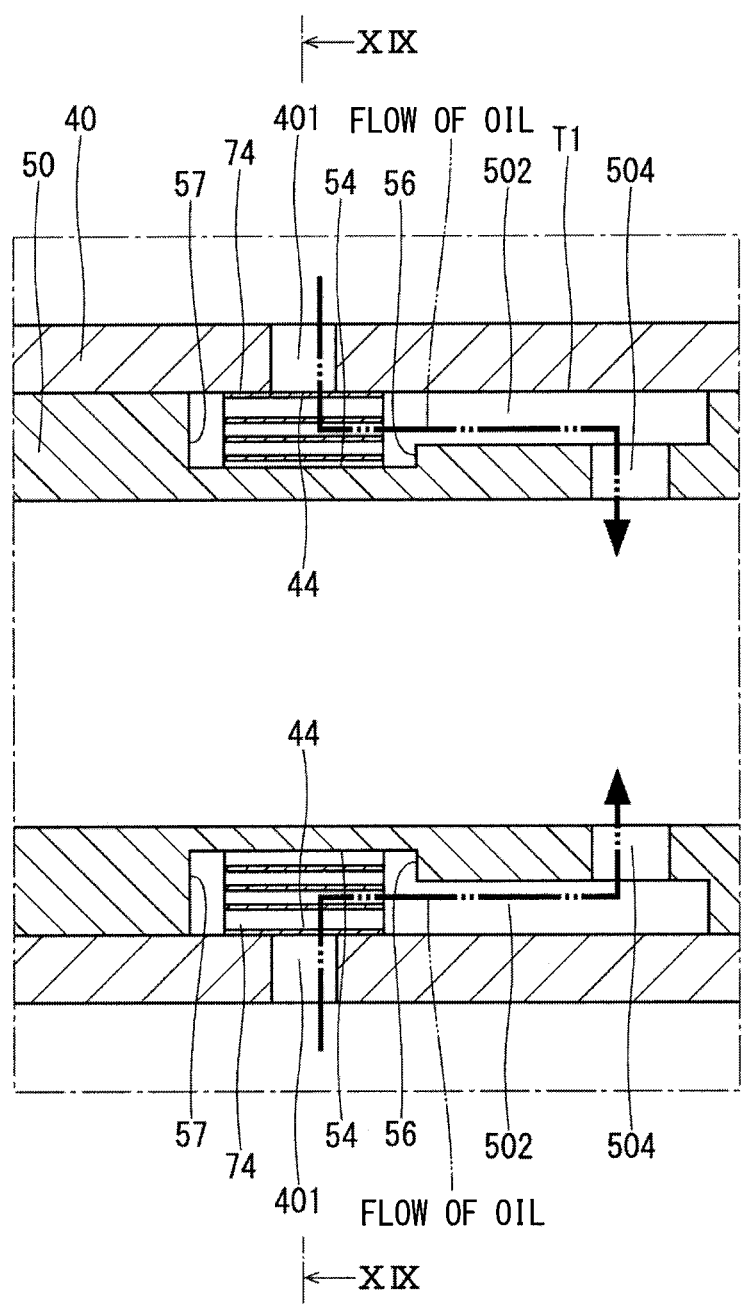

FIG. 18 is a cross-sectional view illustrating an area around a supply check valve of a hydraulic oil control valve according to a seventh embodiment.

Figure 19:
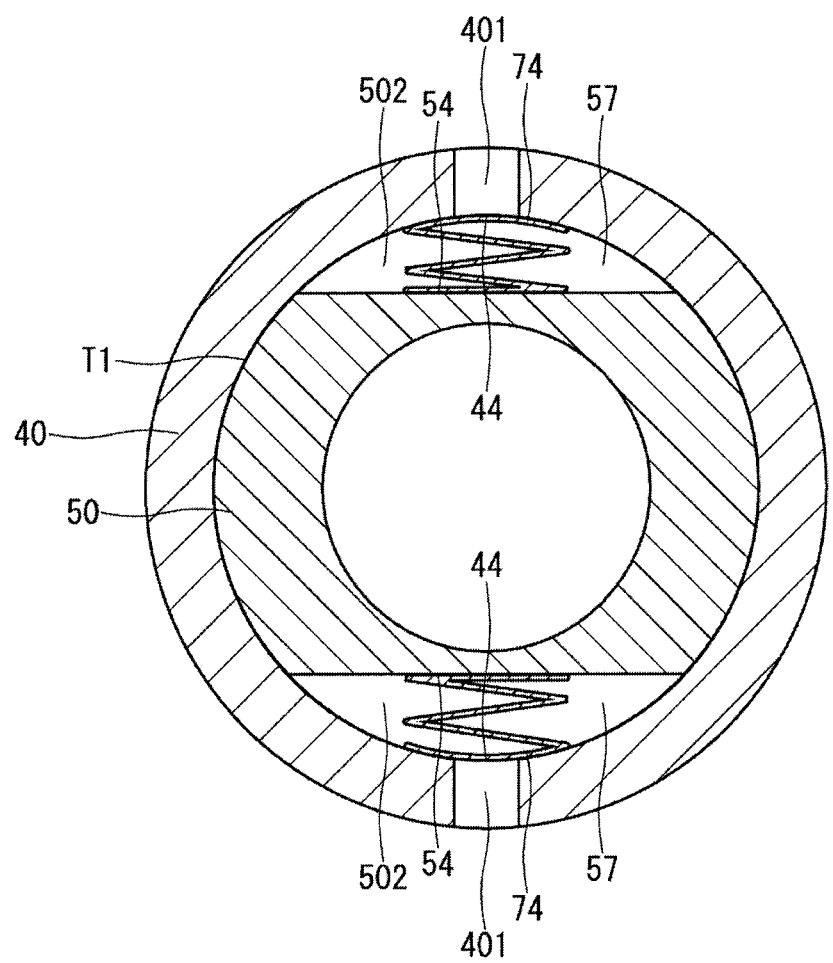

FIG. 19 is a cross-sectional view taken along line XIX-XIX in FIG. 18.

DETAILED DESCRIPTION

In a previously proposed hydraulic oil control valve, an inner sleeve is placed at an inside of an outer sleeve that is shaped in a tubular form, and a check valve, which is resiliently deformable in a radial direction, is placed at an annular space formed between the outer sleeve and the inner sleeve. The check valve controls a flow of the hydraulic oil between an outside of the outer sleeve and an inside of the inner sleeve.

In the previously proposed hydraulic oil control valve, when the hydraulic oil flows from the outside of the outer sleeve into the inside of the inner sleeve through the check valve, the hydraulic oil needs to bypass an outer edge portion of the check valve, so that a flow passage pressure loss may possibly be increased.

Furthermore, in the previously proposed hydraulic oil control valve, when a large amount of the hydraulic oil flows from the outside of the outer sleeve into the inside of the inner sleeve through the check valve, the check valve may possibly close the flow passage of the inner sleeve, and thereby the flow of the hydraulic oil toward the inside of the inner sleeve may possibly be blocked.

Furthermore, a disadvantage, which is similar to the disadvantage discussed above, may possibly occur when the hydraulic oil flows from the inside of the inner sleeve to the outside of the outer sleeve through the check valve.

A hydraulic oil control valve of the present disclosure is configured to control a flow of hydraulic oil to be supplied from a hydraulic oil supply source to a hydraulic oil supply subject. The hydraulic oil control valve includes an outer sleeve, an inner sleeve, a supply passage, an axial passage and a supply check valve.

The outer sleeve is shaped in a tubular form.

The inner sleeve is shaped in a tubular form and is placed at an inside of the outer sleeve.

The supply passage extends through the inner sleeve or the outer sleeve in a radial direction. The supply passage is configured to conduct hydraulic oil that is supplied from the hydraulic oil supply source.

The axial passage is located between the outer sleeve and the inner sleeve and extends in an axial direction. The supply passage opens to one end portion of the axial passage while another end portion of the axial passage is configured to connect with the hydraulic oil supply subject.

The supply check valve is installed in the axial passage and is located on a radial side of the supply passage where a radially outer side of the inner sleeve or a radially inner side of the outer sleeve is placed. The supply check valve is configured to enable a flow of the hydraulic oil from the supply passage toward the axial passage and is configured to limit a flow of the hydraulic oil from the axial passage toward the supply passage.

In the present disclosure, the hydraulic oil, which is conducted from the supply passage to the axial passage, flows to the other end side of the axial passage without bypassing the supply check valve and is supplied to the hydraulic oil supply subject. Therefore, the flow passage pressure loss at the hydraulic oil control valve can be limited.

Furthermore, in the present disclosure, even if a large amount of the hydraulic oil flows from the supply passage to the axial passage, the supply check valve only contacts a wall surface, which is opposed to an opening of the supply passage, and thereby the supply check valve does not block the axial passage. Therefore, it is possible to limit the unintentional passage blockage at the hydraulic oil control valve.

Hereinafter, a valve timing adjustment device according to various embodiments of the present disclosure will be described with reference to the drawings. Components, which are substantially the same in the embodiments, are indicated by the same reference signs and will not be described redundantly.

First Embodiment

Figure 1:
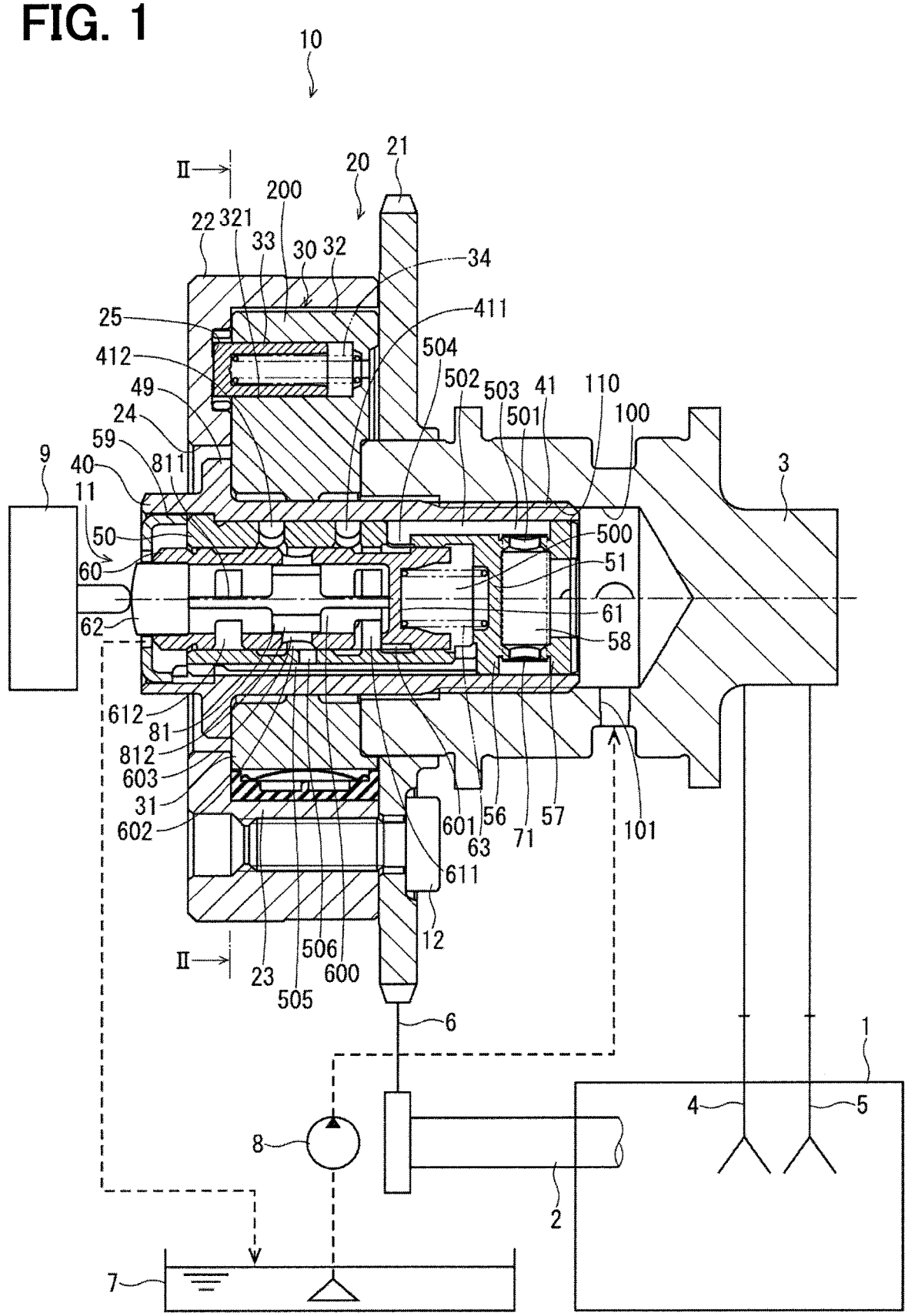
FIG. 1 is a cross-sectional view illustrating a hydraulic oil control valve and a valve timing adjustment device according to a first embodiment.
Figure 2:
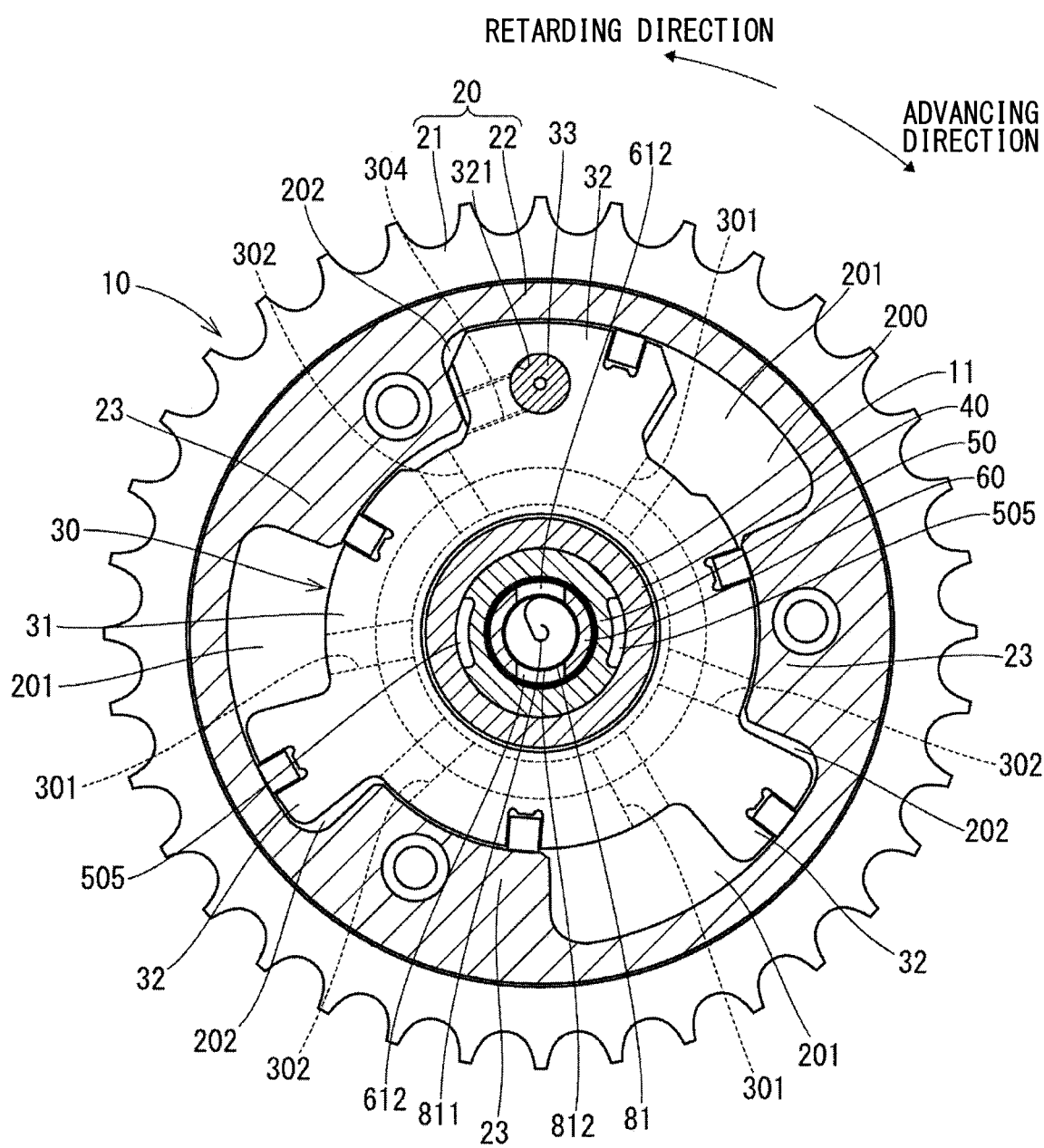
FIG. 2 is a cross-sectional view taken along line II-II in FIG. 1.
Figure 3:
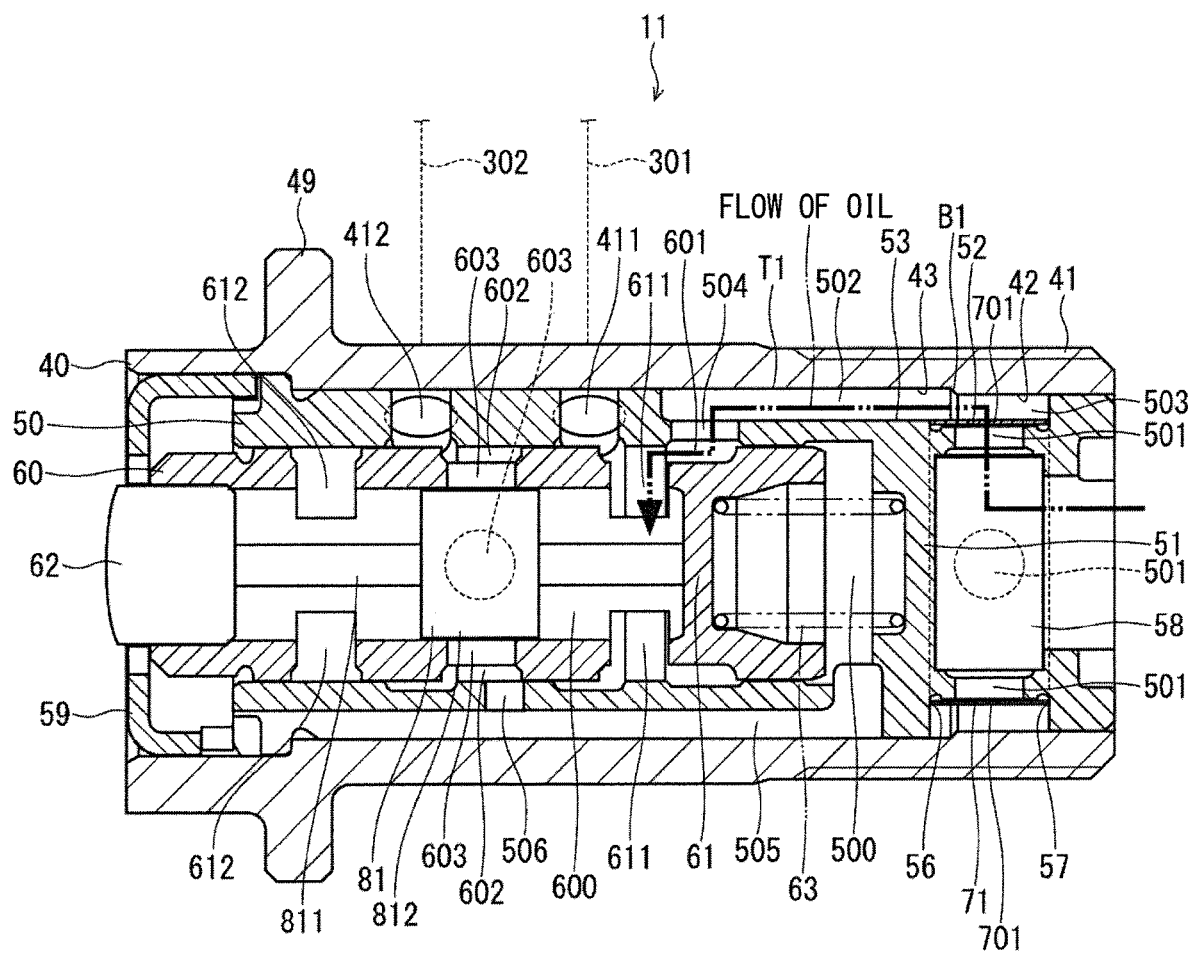
FIG. 3 is a cross-sectional view illustrating the hydraulic oil control valve according to the first embodiment.

FIGS. 1 to 3 show a hydraulic oil control valve and a valve timing adjustment device according to a first embodiment. The valve timing adjustment device 10 changes a rotational phase of a camshaft 3 relative to a crankshaft 2 of an engine 1 (serving as an internal combustion engine), so that the valve timing adjustment device 10 adjusts a valve timing of intake valves 4 among the intake valves 4 and exhaust valves 5 driven to open and close by the camshaft 3. The valve timing adjustment device 10 is installed in a drive force transmission path that extends from the crankshaft 2 to the camshaft 3. The crankshaft 2 corresponds to a drive shaft. The camshaft 3 corresponds to a driven shaft. The intake valves 4 and the exhaust valves 5 correspond to valves.

The structure of the valve timing adjustment device 10 will be described with reference to FIGS. 1 and 2.

The valve timing adjustment device 10 includes a housing 20, a vane rotor 30, and a hydraulic oil control valve 11.

The housing 20 includes a sprocket 21 and a case 22. The sprocket 21 is fitted to an end portion of the camshaft 3. The camshaft 3 rotatably supports the sprocket 21. A chain 6 is wound around the sprocket 21 and the crankshaft 2. The sprocket 21 is rotated synchronously with the crankshaft 2. The case 22 is shaped in a bottomed tubular form. The case 22 is fixed to the sprocket 21 by bolts 12 while an opening end of the case 22 contacts the sprocket 21. The case 22 forms a plurality of partition wall portions 23 that inwardly project in the radial direction. An opening 24 is formed at a center of a bottom of the case 22 such that the opening 24 opens to a space, which is located at the outside of the case 22. The opening 24 is located on an opposite side of the vane rotor 30, which is opposite to the camshaft 3.

The vane rotor 30 has a boss 31 and a plurality of vanes 32. The boss 31 is shaped in a tubular form and is fixed to the end portion of the camshaft 3. Each of the vanes 32 outwardly projects from the boss 31 in the radial direction and is placed between corresponding adjacent two of the partition wall portions 23. The space 200, which is formed in the inside of the housing 20, is partitioned into a retard chamber 201 and an advance chamber 202 by each vane 32. The retard chamber 201 is positioned on one circumferential side of the vane 32. The advance chamber 202 is positioned on the other circumferential side of the vane 32. The retard chambers 201 and the advance chambers 202 correspond to hydraulic chambers. The vane rotor 30 rotates relative to the housing 20 in a retarding direction or an advancing direction according to an oil pressure in the respective retard chambers 201 and an oil pressure in the respective advance chambers 202.

The hydraulic oil control valve 11 includes an outer sleeve 40, an inner sleeve 50, a spool 60, a plurality of supply passages 501, an axial passage 502, a circumferential passage 503, a radial passage 504, a supply check valve 71 and movement limiting portions 56, 57.

In the present embodiment, the hydraulic oil control valve 11 is placed at a center of the vane rotor 30 (see FIGS. 1 and 2).

The outer sleeve 40 is shaped in a substantially cylindrical tubular form and is made of a material, which includes, for example, iron and has a relatively high hardness. An inner peripheral wall of the outer sleeve 40 is substantially in a form of a cylindrical surface.

A threaded portion 41 is formed at an outer peripheral wall of one end portion of the outer sleeve 40. A retaining portion 49 is formed at the other end portion of the outer sleeve 40 such that the retaining portion 49 is shaped in a ring form and outwardly extends from an outer peripheral wall of the other end portion of the outer sleeve 40 in the radial direction.

A shaft hole 100 and a supply hole 101 are formed at an end portion of the camshaft 3 located on the valve timing adjustment device 10 side. The shaft hole 100 is formed to extend in an axial direction of the camshaft 3 from a center of an end surface of the camshaft 3, which is located on the valve timing adjustment device 10 side. The supply hole 101 is formed such that the supply hole 101 inwardly extends from an outer wall of the camshaft 3 in the radial direction and is communicated with the shaft hole 100.

A shaft-side threaded portion 110 is formed at an inner wall of the shaft hole 100 of the camshaft 3 to threadably engage with the threaded portion 41 of the outer sleeve 40.

The outer sleeve 40 passes through the inside of the boss 31 of the vane rotor 30 and is fixed to the camshaft 3 such that the threaded portion 41 of the outer sleeve 40 is engaged with the shaft-side threaded portion 110 of the camshaft 3. At this time, the retaining portion 49 retains an end surface of the boss 31 of the vane rotor 30, which is opposite to the camshaft 3. In this way, the vane rotor 30 is fixed to the camshaft 3 such that the vane rotor 30 is held between the camshaft 3 and the retaining portion 49. The outer sleeve 40 is thus installed to the center of the vane rotor 30.

An oil pump 8 is connected to the supply hole 101. The oil pump 8 suctions the hydraulic oil stored in the oil pan 7 and supplies the suctioned hydraulic oil to the supply hole 101. As a result, the hydraulic oil flows into the shaft hole 100. Here, the oil pump 8 corresponds to a hydraulic oil supply source. Furthermore, the valve timing adjustment device 10 corresponds to a hydraulic oil supply subject.

The inner sleeve 50 is shaped in a substantially cylindrical tubular form and is made of a material, which includes, for example, aluminum and has a relatively low hardness. Specifically, the inner sleeve 50 is made of the material that has the hardness lower than a hardness of the outer sleeve 40. An outer peripheral wall of the inner sleeve 50 is substantially in a form of a cylindrical surface.

The inner sleeve 50 is placed at the inside of the outer sleeve 40 such that outer peripheral wall of the inner sleeve 50 is fitted to the inner peripheral wall of the outer sleeve 40. The inner sleeve 50 is immovable relative to the outer sleeve 40. A sleeve plate 51 is formed at the one end portion of the inner sleeve 50 such that the sleeve plate 51 is in a form of a plate and radially inwardly extends from an inner peripheral wall of the one end portion of the inner sleeve 50. The sleeve plate 51 is located on the radially inner side of the threaded portion 41 of the outer sleeve 40, and the sleeve plate 51 divides a space in the inside of the inner sleeve 50 into a space located one side of the sleeve plate 51 and a space located on the other side of the sleeve plate 51.

The spool 60 is shaped in a substantially cylindrical tubular form and is made of, for example, metal.

The spool 60 is placed in an inside of the inner sleeve 50 such that an outer peripheral wall of the spool 60 is slidable along the inner peripheral wall of the inner sleeve 50 to enable reciprocation of the spool 60 in the axial direction.

A spool plate 61 is formed at one end portion of the spool 60 such that the spool plate 61 is in a form of a plate and radially inwardly extends from an inner peripheral wall of the one end portion of the spool 60. The spool plate 61 divides the space at the inside of the spool 60 into a space located on one side of the spool plate 61 and a space located on the other side of the spool plate 61.

A sealing portion 62 is formed at the other end portion of the spool 60. An outer peripheral wall of the sealing portion 62 is fitted to the inner peripheral wall of the spool 60 and closes the other end portion of the spool 60. An inside space 600, which is shaped into a substantially cylindrical form, is formed between the sealing portion 62 and the spool plate 61 at the inside of the spool 60.

A variable volume space 500 is formed between the sleeve plate 51 and the spool plate 61 at the inside of the inner sleeve 50. A volume of the variable volume space 500 changes when the spool 60 is moved relative to the inner sleeve 50 in the axial direction.

A spring 63 is installed in the variable volume space 500. The spring 63 is a so-called coil spring. One end portion of the spring 63 contacts the sleeve plate 51, and other end portion of the spring 63 contacts the spool plate 61. The spring 63 urges the spool 60 in a direction away from the sleeve plate 51.

A retaining portion 59 is placed on the radially inner side of the other end portion of the outer sleeve 40. The retaining portion 59 is shaped in a bottomed tubular form. An outer peripheral wall of the retaining portion 59 is fitted to the inner peripheral wall of the outer sleeve 40. A hole is formed at a center of a bottom of the retaining portion 59, and the sealing portion 62 is installed in an inside of this hole.

The bottom of the retaining portion 59 is configured to retain the other end portion of the spool 60. The retaining portion 59 can limit movement of the spool 60 toward the side that is opposite to the sleeve plate 51. In this way, removal of the spool 60 from the inside of the inner sleeve 50 is limited.

The supply passages 501 are formed at the one end portion of the inner sleeve 50. The supply passages 501 are located on the side of the sleeve plate 51, which is opposite to the spool 60. The supply passages 501 extend through the inner sleeve 50 in the radial direction. The number of the supply passages 501 is four, and these supply passages 501 are arranged one after the other at equal intervals in a circumferential direction of the inner sleeve 50.

The hydraulic oil flows into the supply passages 501 from the oil pump 8 through the supply hole 101, the shaft hole 100 and the inside of the inner sleeve 50.

Here, a filter 58 is installed at the radially inner side of the supply passages 501 at the inside of the inner sleeve 50. The filter 58 is a mesh that is shaped in a substantially cylindrical tubular form. The filter 58 can capture foreign objects contained in the hydraulic oil that flows from the inside of the inner sleeve 50 to the supply passages 501.

The axial passage 502 is formed to extend in the axial direction at a location between the outer sleeve 40 and the inner sleeve 50.

The axial passage 502 is formed at a fitting interface T1 between the outer sleeve 40 and the inner sleeve 50 such that the axial passage 502 is radially inwardly recessed from the outer peripheral wall of the inner sleeve 50.

One of the four supply passages 501 connects between one end portion of the axial passage 502 and the space at the inside of the inner sleeve 50. Specifically, this supply passage 501 opens to the one end portion of the axial passage 502.

The circumferential passage 503 is formed between the outer sleeve 40 and the inner sleeve 50 such that the circumferential passage 503 extends from the one end portion of the axial passage 502 in the circumferential direction and is thereby shaped in an annular form (see FIGS. 3 and 6). Specifically, the four supply passages 501 are opened to the circumferential passage 503.

The hydraulic oil, which flows into the shaft hole 100 through the supply hole 101, can flow to the axial passage 502 and the circumferential passage 503 through the supply passages 501. The hydraulic oil, which enters the circumferential passage 503 through the supply passages 501, flows through the circumferential passage 503 and then flows through the axial passage 502.

The radial passage 504 extends through the inner sleeve 50 in the radial direction. One end portion of the radial passage 504 is connected to the other end portion of the axial passage 502, and the other end portion of the radial passage 504 is connected to a space at the inside of the inner sleeve 50 (see FIG. 3).

The supply check valve 71 is formed by rolling a rectangular metal thin plate such that a longitudinal direction of the rectangular metal thin plate coincides with the circumferential direction, so that the supply check valve 71 is shaped in a substantially cylindrical tubular form. FIG. 4 is a developed view of the supply check valve 71. FIG. 5 is a view of the supply check valve 71 taken in the axial direction.

The supply check valve 71 includes an overlap portion 700 and a plurality of valve portions 701.

The overlap portion 700 is formed at one circumferential end portion of the supply check valve 71. The overlap portion 700 is formed to overlap with a radially outer side of the other circumferential end portion of the supply check valve 71 (see FIG. 5). Here, the number of the valve portions 701 is four, and these valve portions 701 are arranged one after the other at equal intervals in the circumferential direction of the supply check valve 71.

The supply check valve 71 is placed at the circumferential passage 503. The supply check valve 71 is placed at the one end portion of the axial passage 502 and the circumferential passage 503 such that the supply check valve 71 is resiliently deformable in the radial direction. Here, the supply check valve 71 is formed such that the four valve portions 701 respectively correspond to the four supply passages 501. Specifically, the supply check valve 71 is located on a radial side of the supply passages 501 where the radially outer side of the inner sleeve 50 is placed.

The axial passage 502 includes a valve seat surface 52, a valve seat step surface 53, a stopper surface 42 and a stopper step surface 43.

The valve seat surface 52 is shaped in a ring form at the inner sleeve 50 and is located around the openings of the supply passages 501, and the valve portions 701 of the supply check valve 71 can contact the valve seat surface 52. The valve seat step surface 53 is located on an axial side of the valve seat surface 52 where the other end portion of the axial passage 502 is placed while the valve seat step surface 53 is located on a radial side of the valve seat surface 52 where the radially outer side of the inner sleeve 50 is placed (see FIG. 7).

The stopper surface 42 is formed at the outer sleeve 40 at a location where the stopper surface 42 is opposed to the openings of the supply passages 501. The stopper step surface 43 is located on an axial side of the stopper surface 42 where the other end portion of the axial passage 502 is placed while the stopper step surface 43 is located on a radial side of the stopper surface 42 where the radially outer side of the outer sleeve 40 is placed (see FIG. 7).

The supply check valve 71 is installed in the circumferential passage 503 as follows. That is, in a state where the hydraulic oil does not flow in the supply passages 501, i.e., in a state where an external force is not applied to the supply check valve 71, the overlap portion 700 overlaps with the other circumferential end portion of the supply check valve 71 (see FIG. 6). Furthermore, a surface of the outer peripheral wall of the supply check valve 71 is radially placed at a position that is substantially the same as a position of the valve seat step surface 53 (see FIG. 7).

Here, a boundary B1 between the stopper surface 42 and the stopper step surface 43 is located within an axial extent of the supply check valve 71 (see FIG. 7).

When the hydraulic oil flows to the axial passage 502 and the circumferential passage 503 through the supply passages 501, inner walls of the valve portions 701 of the supply check valve 71 are urged by the hydraulic oil, and thereby the supply check valve 71 is deformed such that the supply check valve 71 expands toward the radially outer side, that is, an inner diameter of the supply check valve 71 is increased. In this way, the valve portions 701 of the supply check valve 71 are spaced away from the valve seat surface 52, so that the hydraulic oil can flow toward the other end portion of the axial passage 502, i.e., toward the radial passage 504 through a gap between each valve portion 701 and the valve seat surface 52. At this time, the overlap portion 700 maintains a state in which a part of the overlap portion 700 overlaps with the other end portion of the supply check valve 71 while a length of the overlapping range, in which the overlap portion 700 overlaps with the other end portion of the supply check valve 71, is reduced.

When a flow rate of the hydraulic oil flowing through the supply passages 501 becomes higher than or equal to a predetermined value, the outer peripheral wall of the supply check valve 71 contacts the stopper surface 42. In this way, the deformation of the supply check valve 71 toward the radially outer side is limited. At this time, a gap S1 is formed between an outer peripheral wall of an axial end portion of the supply check valve 71 and the stopper step surface 43 (see FIG. 7).

In contrast, when the flow rate of the hydraulic oil flowing through the supply passages 501 becomes lower than the predetermined value, the supply check valve 71 is deformed such that the supply check valve 71 shrinks radially inward, i.e., the inner diameter of the supply check valve 71 is reduced. Furthermore, when the hydraulic oil flows from the axial passage 502 toward the supply passages 501, the outer peripheral wall of the supply check valve 71 is radially inwardly urged by the hydraulic oil. Thereby, the valve portions 701 contact the valve seat surface 52. In this way, the flow of the hydraulic oil from the axial passage 502 toward the supply passages 501 is limited. At this time, the supply check valve 71 is deformed such that the outer peripheral wall of the supply check valve 71 is located on the radial side of the valve seat step surface 53 where the radially inner side of the inner sleeve 50 is placed.

As discussed above, the supply check valve 71 functions as the check valve such that the supply check valve 71 enables the flow of the hydraulic oil from the supply passages 501 toward the axial passage 502 and limits the flow of the hydraulic oil from the axial passage 502 toward the supply passages 501.

The movement limiting portion 56 is placed in the circumferential passage 503 at a location that is on the side of the supply check valve 71 where the retaining portion 59 is placed. The movement limiting portion 56 can limit the movement of the supply check valve 71 toward the retaining portion 59 in the axial direction when the movement limiting portion 56 contacts the axial end portion of the supply check valve 71.

The movement limiting portion 57 is placed in the circumferential passage 503 at a location that is on the other side of the supply check valve 71, which is opposite to the retaining portion 59. The movement limiting portion 57 can limit the movement of the supply check valve 71 toward the opposite side that is opposite to the retaining portion 59 in the axial direction when the movement limiting portion 57 contacts the other axial end portion of the supply check valve 71.

As described above, the movement limiting portions 56, 57 can limit the movement of the supply check valve 71 in the axial direction to limit the displacement of the supply check valve 71 away from the supply passages 501. Furthermore, the movement limiting portion 56 can limit the movement of the supply check valve 71 toward the other side of the axial passage 502 to limit closing of the radial passage 504 by the supply check valve 71.

The spool 60 includes a supply passage 601, a plurality of primary control passages 611, a plurality of secondary control passages 612, a drain passage 602 and a plurality of recycle passages 603.

The supply passage 601 is shaped in a substantially cylindrical tubular form such that the supply passage 601 is radially inwardly recessed from an outer peripheral wall of at the one end portion of the spool 60 and extends in a circumferential direction. The supply passage 601 is connected to the radial passage 504. In this way, the supply passage 601 is communicated with the supply passages 501 through the axial passage 502. Thereby, the hydraulic oil is supplied from the oil pump 8 to the supply passage 601 through the supply passages 501, the axial passage 502, and the radial passage 504.

Each of the primary control passages 611 is formed such that the primary control passage 611 extends through the spool 60 in the radial direction. Specifically, the primary control passage 611 connects between the inside space 600 of the spool 60 and the outside of the spool 60. The primary control passages 611 are formed integrally with the supply passage 601. Therefore, the supply passage 601 is communicated with the inside space 600 of the spool 60 through the primary control passages 611. Thus, the hydraulic oil can flow into the inside space 600 through the supply passage 601 and the primary control passages 611.

Each of the secondary control passages 612 is formed such that the secondary control passage 612 extends through the spool 60 in the radial direction. Specifically, the secondary control passage 612 connects between the inside space 600 of the spool 60 and the outside of the spool 60. The secondary control passages 612 are located on the sealing portion 62 side of the primary control passages 611.

The drain passage 602 is located between the primary control passages 611 and the secondary control passages 612 in the axial direction in the spool 60 and is radially inwardly recessed from the outer peripheral wall of the spool 60.

Each of the recycle passages 603 is formed such that the recycle passage 603 extends through the spool 60 in the radial direction at the drain passage 602.

Specifically, the recycle passage 603 connects between the inside space 600 of the spool 60 and the drain passage 602.

A primary control port 411 and a secondary control port 412 are formed at the outer sleeve 40 and the inner sleeve 50.

The primary control port 411 is located on the retaining portion 49 side of the axial passage 502 and extends through the outer sleeve 40 and the inner sleeve 50 in the radial direction. One end portion of the primary control port 411 is connected to the space at the inside of the inner sleeve 50. The other end portion of the primary control port 411 is connected to the retard chambers 201 through a plurality of retard passages 301.

The secondary control port 412 is located on the retaining portion 49 side of the primary control port 411 and extends through the outer sleeve 40 and the inner sleeve 50 in the radial direction. One end portion of the secondary control port 412 is connected to the space at the inside of the inner sleeve 50. The other end portion of the secondary control port 412 is connected to the advance chambers 202 through a plurality of advance passages 302.

A linear solenoid 9 is located on the opposite side of the spool 60, which is opposite to the camshaft 3. The linear solenoid 9 is configured to contact the sealing portion 62. When the linear solenoid 9 is energized, the linear solenoid 9 urges the spool 60 toward the camshaft 3 through the sealing portion 62 against the urging force of the spring 63. As a result, the position of the spool 60 changes in the axial direction relative to the inner sleeve 50. A movable range of the spool 60 extends from a position, at which the spool 60 contacts the retaining portion 59, to a position, at which the spool 60 contacts the sleeve plate 51.

The supply passage 601 is communicated with the radial passage 504 regardless of the axial position of the spool 60 relative to the inner sleeve 50.

When the spool 60 is positioned to contact the retaining portion 59, the primary control passages 611 are connected to the primary control port 411. Furthermore, at this time, the secondary control port 412 is connected to the drain passage 602 and the recycle passages 603. Furthermore, the secondary control passages 612 are disconnected from the secondary control port 412.

In contrast, when the spool 60 is positioned to contact the sleeve plate 51, the secondary control passages 612 are connected to the secondary control port 412. Furthermore, at this time, the primary control port 411 is connected to the drain passage 602 and the recycle passages 603. Moreover, the primary control passages 611 are disconnected from the primary control port 411.

Furthermore, when the spool 60 is placed at an intermediate position between the retaining portion 59 and the sleeve plate 51, the primary control passages 611, the secondary control passages 612, the drain passage 602 and the recycle passages 603 are disconnected from the primary control port 411 and the secondary control port 412. At this time, both of the retard chambers 201 and the advance chambers 202 are closed.

As discussed above, the primary control passages 611 and the secondary control passages 612 can be connected or disconnected relative to the primary control port 411 and the secondary control port 412 depending on the axial position of the spool 60 relative to the inner sleeve 50.

Furthermore, when the spool 60 is positioned to contact the retaining portion 59, the other end portion of the axial passage 502 is connected to the retard chambers 201 through the radial passage 504, the supply passage 601, the primary control passages 611 and the primary control port 411.

Furthermore, when the spool 60 is positioned to contact the sleeve plate 51, the other end portion of the axial passage 502 is connected to the advance chambers 202 through the radial passage 504, the supply passage 601, the primary control passages 611, the inside space 600, the secondary control passages 612 and the secondary control port 412.

As discussed above, the other end portion of the axial passage 502 can be connected to the retard chambers 201 or the advance chambers 202 of the valve timing adjustment device 10 through the radial passage 504.

In the present embodiment, a breathing hole 505 and a drain port 506 are formed at the inner sleeve 50.

The breathing hole 505 is radially inwardly recessed from the outer peripheral wall of the inner sleeve 50 and extends in the axial direction of the inner sleeve 50 (see FIGS. 3 and 6). One end portion of the breathing hole 505 is connected to the variable volume space 500, and the other end portion of the breathing hole 505 is connected to the outside, i.e., the atmosphere through a gap between the retaining portion 59 and the sealing portion 62. As a result, the pressure in the variable volume space 500 can be made equal to the atmospheric pressure. This allows for smooth movement of the spool 60 in the axial direction.

The drain port 506 is formed to connect between the space at the inside of the inner sleeve 50 and the breathing hole 505. The opposite end portion of the drain port 506, which is opposite to the breathing hole 505, is connected to the drain passage 602 regardless of the axial position of the spool 60 relative to the inner sleeve 50. In this way, the hydraulic oil of the drain passage 602 can flow to the outside of the hydraulic oil control valve 11 through the drain port 506, the breathing hole 505 and the gap between the retaining portion 59 and the sealing portion 62.

In the present embodiment, the hydraulic oil control valve 11 further includes a recycle check valve 81.

The recycle check valve 81 is installed at the inside space 600 of the spool 60.

For example, the recycle check valve 81 is formed by rolling a thin metal plate. FIG. 8 is a developed view of the recycle check valve 81. FIG. 3 shows the recycle check valve 81 seen in a direction that is perpendicular to the axis.

The recycle check valve 81 includes a shaft 811 and a valve portion 812.

The shaft 811 is shaped in a substantially cylindrical tubular form. The valve portion 812 is located at a center of the shaft 811 and extends from one circumferential end portion of the shaft 811 such that the valve portion 812 is circumferentially wound all around the shaft 811. An end portion of the valve portion 812, which is opposite to the shaft 811, overlaps with a radially outer side of the valve portion 812.

The recycle check valve 81 is placed at the inside space 600 such that the valve portion 812 corresponds to the recycle passages 603. Here, two opposite end portions of the shaft 811 respectively contact the spool plate 61 and the sealing portion 62, so that the movement of the shaft 811 in the axial direction is limited.

The recycle check valve 81 is placed at the inside space 600 such that the valve portion 812 closes the recycle passages 603. The valve portion 812 of the recycle check valve 81 is resiliently deformable in the radial direction.

When the hydraulic oil flows from the recycle passages 603 toward the inside space 600, the outer wall of the valve portion 812 of the recycle check valve 81 is urged by the hydraulic oil and is thereby deformed such that the valve portion 812 shrinks radially inward, that is, an inner diameter of the valve portion 812 is reduced. In this way, the valve portion 812 is spaced away from the recycle passages 603, so that the hydraulic oil flows into the inside space 600 and then flows through a gap between the valve portion 812 and the inner peripheral wall of the spool 60. At this time, an overlapping area, at which the circumferential end portions of the valve portion 812 overlap with each other, is increased.

In contrast, when the hydraulic oil flows from the inside space 600 toward the recycle passages 603, an inner wall of the valve portion 812 of the recycle check valve 81 is urged by the hydraulic oil and is thereby deformed such that the valve portion 812 expands radially outward, that is, the inner diameter of the valve portion 812 is increased. In this way, the valve portion 812 closes the recycle passages 603, so that the flow of the hydraulic oil from the inside space 600 toward the recycle passages 603 is blocked.

As discussed above, the recycle check valve 81 can function as a check valve such that the recycle check valve 81 enables the flow of the hydraulic oil from the recycle passages 603 toward the inside space 600 and limits the flow of the hydraulic oil from the inside space 600 toward the recycle passages 603.

Next, the operation of the hydraulic oil control valve 11 and the valve timing adjustment device 10 will be described. The hydraulic oil control valve 11 is operable among a first operating state, a second operating state and a holding state by urging the spool 60 through the operation of the linear solenoid 9. In the first operating state, the oil pump 8 is connected to the retard chambers 201, and the advance chambers 202 are connected to the drain passage 602 and the recycle passages 603. In the second operating state, the oil pump 8 is connected to the advance chambers 202, and the retard chambers 201 are connected to the drain passage 602 and the recycle passages 603. In the holding state, the retard chambers 201 and the advance chambers 202 are both closed.

In the first operating state, the hydraulic oil is supplied to the retard chambers 201, and the hydraulic oil is returned from the advance chambers 202 to the inside space 600 through the drain passage 602 and the recycle passages 603 while an excess amount of the hydraulic oil is discharged to the outside of the hydraulic oil control valve 11 through the drain port 506 and the breathing hole 505 and is returned to the oil pan 7. In the second operating state, the hydraulic oil is supplied to the advance chambers 202, and the hydraulic oil is returned from the retard chambers 201 to the inside space 600 through the drain passage 602 and the recycle passages 603 while an excess amount of the hydraulic oil is discharged to the outside of the hydraulic oil control valve 11 through the drain port 506 and the breathing hole 505 and is returned to the oil pan 7. In the holding state, the hydraulic oil in the retard chambers 201 and the hydraulic oil in the advance chambers 202 are retained.

The present embodiment is further provided with a lock pin 33 (see FIGS. 1 and 2). The lock pin 33 is shaped in a bottomed cylindrical tubular form. The lock pin 33 is received in a receiving hole 321 formed at the vane 32 in such a manner that the lock pin 33 can axially reciprocate in the receiving hole 321. A spring 34 is installed in an inside of the lock pin 33. The spring 34 urges the lock pin 33 toward a bottom of the case 22. A fitting recess 25 is formed at the bottom of the case 22 on the vane 32 side of the bottom of the case 22.

The lock pin 33 can be fitted into the fitting recess 25 when the vane rotor 30 is held at a most retarded position with respect to the housing 20. When the lock pin 33 is fitted into the fitting recess 25, relative rotation of the vane rotor 30 relative to the housing 20 is limited. On the other hand, when the lock pin 33 is not fitted into the fitting recess 25, the relative rotation of the vane rotor 30 relative to the housing 20 is enabled.

A pin control passage 304, which is communicated with a corresponding one of the advance chambers 202, is formed in the vane 32 at a location between the lock pin 33 and the advance chamber 202 (see FIG. 2). The pressure of the hydraulic oil, which flows from the advance chamber 202 into the pin control passage 304, is exerted in a removing direction for removing the lock pin 33 from the fitting recess 25 against the urging force of the spring 34.

In the valve timing adjustment device 10 constructed in the above-described manner, when the hydraulic oil is supplied to the advance chambers 202, the hydraulic oil flows into the pin control passage 304. Thus, the lock pin 33 is removed from the fitting recess 25, and thereby the relative rotation of the vane rotor 30 relative to the housing 20 is enabled.

The valve timing adjustment device 10 brings the hydraulic oil control valve 11 into the first operating state when the rotational phase of the camshaft 3 is on the advance side of a target value. As a result, the vane rotor 30 undergoes relative rotation in the retarding direction relative to the housing 20, so that the rotational phase of the camshaft 3 shifts to the retard side.

The valve timing adjustment device 10 brings the hydraulic oil control valve 11 into the second operating state when the rotational phase of the camshaft 3 is on the retard side of the target value. As a result, the vane rotor 30 undergoes relative rotation in the advancing direction relative to the housing 20, so that the rotational phase of the camshaft 3 shifts to the advance side.

The valve timing adjustment device 10 brings the hydraulic oil control valve 11 into the holding state when the rotational phase of the camshaft 3 coincides with the target value. In this way, the rotational phase of the camshaft 3 is maintained.

In the present embodiment, the recycle passages 603 enable reuse of a portion of the hydraulic oil discharged from the retard chambers 201 and a portion of the hydraulic oil discharged from the advance chambers 202.

Furthermore, in the present embodiment, the pressure of the variable volume space 500 is kept substantially equal to the atmospheric pressure through the breathing hole 505. Therefore, when the spool 60 is urged by the linear solenoid 9, the spool 60 can be smoothly reciprocated at the inside of the inner sleeve 50. When the hydraulic oil is accumulated in the variable volume space 500, the hydraulic oil flows to the side of the hydraulic oil control valve 11, which is opposite to the camshaft 3, through the breathing hole 505, that is, the hydraulic oil flows to the outside of the valve timing adjustment device 10 through the breathing hole 505 and is returned to the oil pan 7.

When the oil pump 8 is operated in the first operating state or the second operating state of the hydraulic oil control valve 11, the hydraulic oil flows to the axial passage 502 through the supply passages 501. At this time, the supply check valve 71 is displaced away from the valve seat surface 52, i.e., is opened, so that the supply check valve 71 enables the flow of the hydraulic oil. At this time, if the flow rate of the hydraulic oil is large, the supply check valve 71 is further deformed toward the radially outer side and contacts the stopper surface 42. At this time, the flow of the hydraulic oil is not interfered by the supply check valve 71, so that the hydraulic oil smoothly flows from the supply passages 501 into the axial passage 502 and then flows in the axial passage 502 in the axial direction. Here, in a case where the hydraulic oil in the retard chambers 201 or the advance chambers 202 is compressed by an action of a torque transmitted from the camshaft 3 and thereby has an increased pressure, a backflow of the hydraulic oil may possibly occur at the supply passages 501 and the axial passage 502. Here, the backflow refers to a flow from the axial passage 502 toward the supply passages 501. This definition is also applied to the following description.

When the backflow of the hydraulic oil occurs in the state where the supply check valve 71 contacts the stopper surface 42, the hydraulic oil flows into the gap S1 between the supply check valve 71 and the stopper step surface 43, and thereby the outer wall of the supply check valve 71 is urged toward the radially inner side. In this way, the supply check valve 71 can be rapidly closed.

Furthermore, in the present embodiment, the valve seat step surface 53 is located on a radial side of the valve seat surface 52 where the radially outer side of the inner sleeve 50 is placed. In a state where an external force is not applied to the supply check valve 71, a surface of an outer peripheral wall of the supply check valve 71 is radially placed at a position that is substantially the same as a position of the valve seat step surface 53. When the backflow of the hydraulic oil is generated in this state of the supply check valve 71, the hydraulic oil of the axial passage 502 does not flow into the gap between the inner wall of the supply check valve 71 and the valve seat surface 52 and urges the outer wall of the supply check valve 71 toward the radially inner side. In this way, the supply check valve 71 can be rapidly closed.

Furthermore, in the present embodiment, the movement limiting portions 56, 57 can limit movement of the supply check valve 71 in the axial direction to limit the displacement of the supply check valve 71 away from the supply passages 501.

Furthermore, the movement limiting portion 56 can limit the movement of the supply check valve 71 toward the other side of the axial passage 502 to limit closing of the radial passage 504 by the supply check valve 71.

As discussed above, according to the present embodiment, there is provided the hydraulic oil control valve 11 that can control the flow of hydraulic oil to be supplied from the oil pump 8 to the valve timing adjustment device 10. The hydraulic oil control valve 11 includes the outer sleeve 40, the inner sleeve 50, the supply passages 501, the axial passage 502 and the supply check valve 71.

The outer sleeve 40 is shaped in the tubular form.

The inner sleeve 50 is shaped in the tubular form and is placed at the inside of the outer sleeve 40.

Each of the supply passages 501 extends through the inner sleeve 50 in the radial direction and conducts the hydraulic oil received from the oil pump 8.

The axial passage 502 is located between the outer sleeve 40 and the inner sleeve 50 and extends in the axial direction. The supply passage 501 opens to the one end portion of the axial passage 502 while the other end portion of the axial passage 502 is configured to connect with the valve timing adjustment device 10.

The supply check valve 71 is installed in the axial passage 502 and is located on the radial side of the supply passages 501 where the radially outer side of the inner sleeve 50 is placed. The supply check valve 71 enables the flow of the hydraulic oil from the supply passages 501 toward the axial passage 502 and limits a flow of the hydraulic oil from the axial passage 502 toward the supply passages 501.

In the present embodiment, the hydraulic oil, which is conducted from the supply passages 501 to the axial passage 502, flows to the other end side of the axial passage 502 without bypassing the supply check valve 71 and is supplied to the valve timing adjustment device 10. Therefore, the flow passage pressure loss at the hydraulic oil control valve 11 can be limited. In this way, the responsiveness of the valve timing adjustment device 10 can be improved.

Furthermore, in the present embodiment, even if a large amount of the hydraulic oil flows from the supply passages 501 to the axial passage 502, the supply check valve 71 only contacts the wall surface, which is opposed to the openings of the supply passages 501, and thereby the supply check valve 71 does not block the axial passage 502. Therefore, it is possible to limit the unintentional passage blockage at the hydraulic oil control valve 11.

Furthermore, the present embodiment is provided with the movement limiting portions 56, 57 that can limit the movement of the supply check valve 71 in the axial direction. Therefore, it is possible to limit the movement of the supply check valve 71 in the axial direction to limit the displacement of the supply check valve 71 away from the supply passages 501. Thereby, it is possible to maintain the state where the supply check valve 71 functions as the check valve.

Furthermore, the present embodiment is provided with the circumferential passage 503. The circumferential passage 503 is formed between the outer sleeve 40 and the inner sleeve 50 such that the circumferential passage 503 extends from the one end portion of the axial passage 502 in the circumferential direction and is thereby shaped in the annular form.

The supply check valve 71 is shaped in a tubular form and is placed at the one end portion of the axial passage 502 and the circumferential passage 503 such that the supply check valve 71 is resiliently deformable in the radial direction.

The axial passage 502 has the valve seat surface 52 and the stopper surface 42. The valve seat surface 52 is formed around the opening of the respective supply passages 501. The supply check valve 71 is configured to contact the valve seat surface 52. The stopper surface 42 is formed at the location where the stopper surface 42 is opposed to the opening of the respective supply passages 501. The stopper surface 42 is configured to limit the radial deformation of the supply check valve 71 when the supply check valve 71 contacts the stopper surface 42.

In the present embodiment, the circumferential passage 503 and the supply check valve 71 can be relatively easily formed. Furthermore, by forming the stopper surface 42 in the above described manner, the deformation of the supply check valve 71 can be limited without interfering the flow of the hydraulic oil.

Furthermore, in the present embodiment, the axial passage 502 has the valve seat step surface 53. The valve seat step surface 53 is located on the axial side of the valve seat surface 52 where the other end side of the axial passage 502 is placed while the valve seat step surface 53 is located on the radial side of the valve seat surface 52 where the radially outer side of the inner sleeve 50 is placed. Therefore, the surface of the outer wall of the supply check valve 71 can be placed at: the position that is substantially the same as the position of the valve seat step surface 53; or the position that is on the valve seat surface 52 side of the valve seat step surface 53. When the backflow of the hydraulic oil is generated in this state of the supply check valve 71, the hydraulic oil of the axial passage 502 does not flow into the space at the inside of the supply check valve 71 and urges the outer wall of the supply check valve 71 toward the radially inner side. In this way, the supply check valve 71 can be rapidly closed. Specifically, the valve seat step surface 53 can limit generation of a flow of the hydraulic oil that would interferes with the valve closing of the supply check valve 71.

Furthermore, in the present embodiment, the axial passage 502 has the stopper step surface 43. The stopper step surface 43 is located on the axial side of the stopper surface 42 where the other end portion of the axial passage 502 is placed while the stopper step surface 43 is located on the radial side of the stopper surface 42 where the radially outer side of the outer sleeve 40 is placed.

Furthermore, in the present embodiment, the boundary between the stopper surface 42 and the stopper step surface 43 is located within the axial extent of the supply check valve 71. Therefore, the gap 51 is formed between the outer wall of the supply check valve 71 and the stopper step surface 43 in the state where the supply check valve 71 contacts the stopper surface 42, so that further deformation of the supply check valve 71 is limited. Thus, when the backflow of the hydraulic oil is generated, the hydraulic oil flows into the gap S1, so that the outer wall of the supply check valve 71 is urged toward the radially inner side. In this way, the supply check valve 71 can be rapidly closed.

Furthermore, the present embodiment is provided with the radial passage 504. The radial passage 504 extends through the inner sleeve 50 in the radial direction. The one end portion of the radial passage 504 is connected to the other end portion of the axial passage 502, and the other end portion of the radial passage 504 is configured to connect with the valve timing adjustment device 10. The radial passage 504 enables the flow of the hydraulic oil from the axial passage 502 to the inside of the inner sleeve 50.

In the present embodiment, due to the presence of the movement limiting portion 56, the movement of the supply check valve 71 toward the other side of the axial passage 502 can be limited to limit the closing the radial passage 504 by the supply check valve 71. Therefore, it is possible to limit the unintentional passage blockage at the hydraulic oil control valve 11 that has the radial passage 504.

Furthermore, in the present embodiment, the inner peripheral wall of the outer sleeve 40 is substantially in the form of the cylindrical surface. The outer peripheral wall of the inner sleeve 50 is substantially in the form of the cylindrical surface. The axial passage 502 is formed at the fitting interface T1 between the outer sleeve 40 and the inner sleeve 50 such that the axial passage 502 is radially inwardly recessed from the outer peripheral wall of the inner sleeve 50. Therefore, the fitting interface T1 between the outer sleeve 40 and the inner sleeve 50 as well as the axial passage 502 can be accurately formed.

Furthermore, in the present embodiment, the outer sleeve 40 has the threaded portion 41 formed at the outer peripheral wall of the outer sleeve 40 while the threaded portion 41 is threadably engageable with the inner wall of the valve timing adjustment device 10. The inner sleeve 50 is made of the material that has the hardness lower than the hardness of the outer sleeve 40. The axial passage 502 and the movement limiting portions 56, 57 are formed at the inner sleeve 50. Accordingly, the axial passage 502 and the movement limiting portions 56, 57 can be easily and accurately formed at the inner sleeve 50 by, for example, cutting while a required strength of the threaded portion 41 of the outer sleeve 40 is ensured.

Furthermore, in the present embodiment, the outer sleeve 40 is made of the material that includes iron. The inner sleeve 50 is made of the material that includes aluminum. This specifically indicates the structure of the inner sleeve 50 that has the hardness, which is lower than the hardness of the outer sleeve 40. With this structure, the axial passage 502 can be easily formed at the inner sleeve 50 while ensuring the required strength of the outer sleeve 40.

Furthermore, in the present embodiment, the outer sleeve 40 and the inner sleeve 50 have the primary control port 411 and the secondary control port 412 that are configured to connect with the valve timing adjustment device 10. Furthermore, the present embodiment is provided with the spool 60. The spool 60 is shaped in the tubular form. The spool 60 is configured to reciprocate in the axial direction at the inside of the inner sleeve 50 and forms the inside space 600 at the inside of the spool 60. The spool 60 has the supply passage 601, the primary control passages 611 and the secondary control passages 612. The supply passage 601 is configured to connect between the inside space 600 and the other end portion of the axial passage 502. Each of the primary control passages 611 and the secondary control passages 612 is configured to connect between the inside space 600 and the corresponding one of the primary control port 411 and the secondary control port 412. The spool 60 enables and disables communication between the primary control passages 611 or the secondary control passages 612 and the primary control port 411 or the secondary control port 412 depending on the position of the spool 60 relative to the inner sleeve 50.

This indicates a specific example of the case where the hydraulic oil control valve 11 is used for the control of the valve timing adjustment device 10. By enabling and disabling the communication between each control passage and the corresponding control port with the spool 60, the operational state of the valve timing adjustment device 10 can be changed among the plurality of states.

According to the present embodiment, there is provided the valve timing adjustment device 10 that is installed in the drive force transmission path, which extends from the crankshaft 2 to the camshaft 3 of the engine 1, to adjust the valve timing of the intake valves 4 or the exhaust valves 5 that are driven to open or close by the camshaft 3. The valve timing adjustment device 10 of the present embodiment includes the housing 20, the vane rotor 30 and the hydraulic oil control valve 11.

The housing 20 is rotated synchronously with the crankshaft 2 and is fitted to an end portion of the camshaft 3 such that the housing 20 is rotatably supported by the camshaft 3.

The vane rotor 30 is fixed to the end portion of the camshaft 3. The vane rotor 30 includes the vanes 32, each of which partitions the inside space 200 of the housing 20 into the retard chamber 201 and the advance chamber 202. The vane rotor 30 is rotated relative to the housing 20 depending on the pressure of the hydraulic oil supplied from the oil pump 8 to the retard chambers 201 and the advance chambers 202.

The hydraulic oil control valve 11 can control the flow of hydraulic oil to be supplied from the oil pump 8 to the valve timing adjustment device 10.

The primary control port 411 is connected to the retard chambers 201, and the secondary control port 412 is connected to the advance chambers 202.

This indicates a specific example of the case where the hydraulic oil control valve 11 is used for the control of the valve timing adjustment device 10. The hydraulic oil control valve 11 of the present embodiment can limit the flow passage pressure loss and the unintentional passage blockage. Therefore, the high responsiveness of the hydraulic oil control valve 11 can be achieved, and thereby the valve timing adjustment device 10 can be efficiently and accurately controlled.

Furthermore, in the present embodiment, the hydraulic oil control valve 11 is installed at the center of the vane rotor 30. Specifically, the hydraulic oil control valve 11 and the valve timing adjustment device 10 are integrally formed. Therefore, the hydraulic oil control valve 11 and the valve timing adjustment device 10 can be disposed compactly.

Second Embodiment

FIGS. 9 to 11 show a portion of a hydraulic oil control valve according to a second embodiment. The second embodiment differs from the first embodiment with respect to the configurations of the outer sleeve 40, the inner sleeve 50 and the spool 60.

In the second embodiment, a plurality of supply passages 401 is formed at the outer sleeve 40. Each of the supply passages 401 is formed such that the supply passage 401 extends through the outer sleeve 40 in the radial direction on the retaining portion 49 side of the threaded portion 41. For example, the number of the supply passages 401 is four, and these supply passages 401 are arranged one after the other at equal intervals in the circumferential direction of the outer sleeve 40. The supply passages 401 conduct the hydraulic oil supplied from the oil pump 8.

A plurality of axial passages 502 is formed to extend in the axial direction at a location between the outer sleeve 40 and the inner sleeve 50.

Each of the axial passages 502 is formed at the fitting interface T1 between the outer sleeve 40 and the inner sleeve 50 such that the axial passage 502 is radially inwardly recessed from the outer peripheral wall of the inner sleeve 50.

In the present embodiment, the number of the axial passages 502 is four, and these four axial passages 502 are arranged one after the other at equal intervals in the circumferential direction of the inner sleeve 50 (see FIG. 10).

Each of the four supply passages 401 connects between one end portion of the corresponding one of four axial passages 502 and the outside of the outer sleeve 40. Specifically, each of the supply passages 401 opens to the one end portion of the corresponding one of the axial passages 502.

The circumferential passage 503 is formed between the outer sleeve 40 and the inner sleeve 50 such that the circumferential passage 503 extends from the one end portion of the respective axial passages 502 in the circumferential direction and is thereby shaped in an annular form (see FIGS. 9 to 11). Specifically, the four supply passages 401 are opened to the circumferential passage 503. Furthermore, the circumferential passage 503 is connected to the one end portions of the four axial passages 502.

The hydraulic oil, which is supplied from the oil pump 8, can be conducted to the axial passages 502 and the circumferential passage 503 through the supply passages 401.

Each of a plurality of radial passages 504 extends through the inner sleeve 50 in the radial direction. One end portion of each radial passage 504 is connected to the other end portion of the corresponding axial passage 502, and the other end portion of the radial passage 504 is connected to a space at the inside of the inner sleeve 50 (see FIGS. 9 to 11). The number of the radial passages 504 is four, and the four radial passages 504 are connected to the four axial passages 502, respectively (see FIG. 10).

The configuration of the supply check valve 71 is similar to that of the first embodiment.

The supply check valve 71 is placed at the circumferential passage 503. The supply check valve 71 is placed at the one end portions of the axial passages 502 and the circumferential passage 503 such that the supply check valve 71 is resiliently deformable in the radial direction. Here, the supply check valve 71 is formed such that the four valve portions 701 respectively correspond to the four supply passages 401. Specifically, the supply check valve 71 is located on the radial side of the supply passages 401 where the radially inner side of the outer sleeve 40 is placed.

The axial passages 502 include a valve seat surface 44, a valve seat step surface 45, a stopper surface 54 and a stopper step surface 55.

The valve seat surface 44 is shaped in a ring form and is located around the openings of the supply passages 401 at the outer sleeve 40, and the valve portions 701 of the supply check valve 71 can contact the valve seat surface 44. The valve seat step surface 45 is located on an axial side of the valve seat surface 44 where the other end portions of the axial passages 502 are placed while the valve seat step surface 45 is located on a radial side of the valve seat surface 44 where the radially inner side of the outer sleeve 40 is placed (see FIG. 11).

The stopper surface 54 is formed at the inner sleeve 50 at a location where the stopper surface 54 is opposed to the openings of the supply passages 401. The stopper step surface 55 is located on an axial side of the stopper surface 54 where the other end portions of the axial passages 502 are placed while the stopper step surface 55 is located on a radial side of the stopper surface 54 where the radially inner side of the inner sleeve 50 is placed (see FIG. 11).

The supply check valve 71 is installed in the circumferential passage 503 as follows. That is, in a state where the hydraulic oil does not flow in the supply passages 401, i.e., in a state where an external force is not applied to the supply check valve 71, the surface of the inner peripheral wall of the supply check valve 71 is substantially placed at the position where the valve seat step surface 45 is placed (see FIG. 11).

Here, a boundary B1 between the stopper surface 54 and the stopper step surface 55 is located within an axial extent of the supply check valve 71 (see FIG. 11).

When the hydraulic oil flows to the axial passages 502 and the circumferential passage 503 through the supply passages 401, the outer walls of the valve portions 701 of the supply check valve 71 are urged by the hydraulic oil, and thereby the supply check valve 71 is deformed such that the supply check valve 71 shrinks toward the radially inner side, that is, an inner diameter of the supply check valve 71 is reduced. In this way, each of the valve portions 701 of the supply check valve 71 is spaced away from the valve seat surface 44, so that the hydraulic oil can flow toward the other end portions of the axial passages 502, i.e., toward the radial passages 504 through a gap between each valve portion 701 and the valve seat surface 44.

When a flow rate of the hydraulic oil flowing through the supply passages 401 becomes higher than or equal to a predetermined value, the inner peripheral wall of the supply check valve 71 contacts the stopper surface 54. In this way, the deformation of the supply check valve 71 toward the radially inner side is limited. At this time, a gap S1 is formed between an inner peripheral wall of an axial end portion of the supply check valve 71 and the stopper step surface 55 (see FIG. 11).

In contrast, when the flow rate of the hydraulic oil flowing through the supply passages 401 becomes lower than the predetermined value, the supply check valve 71 is deformed such that the supply check valve 71 expands radially outwardly, i.e., the inner diameter of the supply check valve 71 is increased. Furthermore, when the hydraulic oil flows from the axial passages 502 toward the supply passages 401, the inner peripheral wall of the supply check valve 71 is radially outwardly urged by the hydraulic oil. Thereby, the valve portions 701 contact the valve seat surface 44. In this way, the flow of the hydraulic oil from the axial passages 502 toward the supply passages 401 is limited. At this time, the supply check valve 71 is deformed such that the inner peripheral wall of the supply check valve 71 is located on the radial side of the valve seat step surface 45 where the radially outer side of the outer sleeve 40 is placed.

As discussed above, the supply check valve 71 functions as the check valve such that the supply check valve 71 enables the flow of the hydraulic oil from the supply passages 401 toward the axial passages 502 and limits the flow of the hydraulic oil from the axial passages 502 toward the supply passages 401.

The movement limiting portion 56 is placed in the circumferential passage 503 at a location that is on the other side of the supply check valve 71, which is opposite to the retaining portion 59. The movement limiting portion 56 can limit the movement of the supply check valve 71 toward the opposite side that is opposite to the retaining portion 59 in the axial direction when the movement limiting portion 56 contacts another axial end portion of the supply check valve 71.

The movement limiting portion 57 is placed in the circumferential passage 503 at a location that is on the side of the supply check valve 71 where the retaining portion 59 is placed. The movement limiting portion 57 can limit the movement of the supply check valve 71 toward the retaining portion 59 in the axial direction when the movement limiting portion 57 contacts the axial end portion of the supply check valve 71.

As described above, the movement limiting portions 56, 57 can limit the movement of the supply check valve 71 in the axial direction to limit the displacement of the supply check valve 71 away from the supply passages 401. Furthermore, the movement limiting portion 56 can limit the movement of the supply check valve 71 toward the other side of the axial passage 502 to limit closing of the radial passages 504 by the supply check valve 71.

In the present embodiment, the sleeve plate 51 is formed such that the sleeve plate 51 closes the one end portion of the inner sleeve 50 (see FIG. 9). A breathing hole 507 is formed at the sleeve plate 51. The breathing hole 507 connects the variable volume space 500 to the outside of the hydraulic oil control valve 11, i.e., the atmosphere. As a result, the pressure of the variable volume space 500 can be made equal to the atmospheric pressure, and thereby the smooth movement of the spool 60 in the axial direction is made possible.

In the present embodiment, the supply passage 601 is shaped in the substantially cylindrical tubular form such that the supply passage 601 is radially inwardly recessed from the outer peripheral wall of the one end portion of the spool 60 and extends in the circumferential direction. The one end portion of the supply passage 601 is connected to the radial passages 504. In this way, the supply passage 601 is communicated with the supply passages 401 through the axial passages 502. Thereby, the hydraulic oil is supplied from the oil pump 8 to the supply passage 601 through the supply passages 401, the axial passages 502, and the radial passages 504.

Each of the primary control passages 611 is formed such that the primary control passage 611 extends through the inner sleeve 50 in the radial direction. The primary control passages 611 are formed integrally with the supply passage 601. Therefore, the supply passage 601 is communicated with the inside space 600 of the spool 60 through the primary control passages 611. Thus, the hydraulic oil can flow into the inside space 600 through the supply passage 601 and the primary control passages 611.

The configurations of the secondary control passages 612, the drain passage 602, the recycle passages 603, the primary control port 411 and the secondary control port 412 are similar to those of the first embodiment and thereby will not be described redundantly.

Furthermore, the enablement and disablement of the communication between each control passage and the corresponding control port by the spool 60 are also similar to those of the first embodiment and thereby will not be described redundantly. Also, the configuration and the location of the recycle check valve 81 are similar to those of the first embodiment and thereby will not be described redundantly.

In the present embodiment, a drain hole 508 is formed at the inner sleeve 50 in place of the breathing hole 505. The drain hole 508 is radially inwardly recessed from the outer peripheral wall of the inner sleeve 50 and extends in the axial direction of the inner sleeve 50 (see FIG. 9). Furthermore, the drain port 506 opens to one end portion of the drain hole 508, and the other end portion of the drain hole 508 is communicated with the outside, i.e., the atmosphere through a gap between the retaining portion 59 and the sealing portion 62. In this way, the hydraulic oil can be drained to the outside of the hydraulic oil control valve 11 through the drain port 506 and the drain hole 508. In the present embodiment, when the oil pump 8 is operated in the first operating state or the second operating state of the hydraulic oil control valve 11, the hydraulic oil flows to the axial passages 502 through the supply passages 401. At this time, the supply check valve 71 is displaced away from the valve seat surface 44, i.e., is opened, so that the supply check valve 71 enables the flow of the hydraulic oil. At this time, if the flow rate of the hydraulic oil is large, the supply check valve 71 is further deformed toward the radially inner side and contacts the stopper surface 54. At this time, the flow of the hydraulic oil is not interfered by the supply check valve 71, so that the hydraulic oil smoothly flows from the supply passages 401 into the axial passages 502 and then smoothly flows in the axial passages 502 in the axial direction. Here, if the oil pump 8 is stopped, a back flow of the hydraulic oil may possibly occur at the supply passages 401 and the axial passages 502.

When the backflow of the hydraulic oil occurs in the state where the supply check valve 71 contacts the stopper surface 54, the hydraulic oil flows into the gap S1 between the supply check valve 71 and the stopper step surface 55, and thereby the inner wall of the supply check valve 71 is urged toward the radially outer side. In this way, the supply check valve 71 can be rapidly closed.

Furthermore, in the present embodiment, the valve seat step surface 45 is located on the radial side of the valve seat surface 44 where the radially inner side of the outer sleeve 40 is placed. In a state where the external force is not applied to the supply check valve 71, a surface of an inner peripheral wall of the supply check valve 71 is radially placed at a position that is substantially the same as a position of the valve seat step surface 45. When the backflow of the hydraulic oil is generated in this state of the supply check valve 71, the hydraulic oil of the axial passage 502 does not flow into the gap between the outer wall of the supply check valve 71 and the valve seat surface 44 and urges the inner wall of the supply check valve 71 toward the radially outer side. In this way, the supply check valve 71 can be rapidly closed.

Furthermore, in the present embodiment, the movement limiting portions 56, 57 can limit the movement of the supply check valve 71 in the axial direction to limit the displacement of the supply check valve 71 away from the supply passages 401.

Furthermore, the movement limiting portion 56 can limit the movement of the supply check valve 71 toward the other side of the axial passage 502 to limit closing of the radial passages 504 by the supply check valve 71.

As described above, in the present embodiment, each of the supply passages 401 is formed such that the supply passage 401 extends through the outer sleeve 40 in the radial direction and is configured to conduct the hydraulic oil supplied from the oil pump 8. Each of the axial passages 502 is located between the outer sleeve 40 and the inner sleeve 50 and extends in the axial direction. The supply passage 401 opens to the one end portion of the corresponding axial passage 502 while the other end portion of the axial passage 502 is configured to connect with the valve timing adjustment device 10. The supply check valve 71 is installed in the axial passages 502 and is located on the radial side of the supply passages 401 where the radially inner side of the outer sleeve 40 is placed. The supply check valve 71 enables the flow of the hydraulic oil from the supply passages 401 toward the axial passages 502 and limits the flow of the hydraulic oil from the axial passages 502 toward the supply passages 401.

In the present embodiment, the hydraulic oil, which is conducted from each of the supply passages 401 to the corresponding axial passage 502, flows to the other end side of the axial passage 502 without bypassing the supply check valve 71 and is supplied to the valve timing adjustment device 10. Therefore, the flow passage pressure loss at the hydraulic oil control valve 11 can be limited. In this way, the responsiveness of the valve timing adjustment device 10 can be improved.

Furthermore, even if a large amount of the hydraulic oil flows from the supply passages 401 to the axial passages 502, the supply check valve 71 only contacts the wall surface, which is opposed to the openings of the supply passages 401, and thereby the supply check valve 71 does not block the axial passages 502. Therefore, it is possible to limit the unintentional passage blockage at the hydraulic oil control valve 11.

Furthermore, in the present embodiment, the axial passage 502 has the valve seat surface 44 and the stopper surface 54. The valve seat surface 44 is formed around the opening of the supply passage 401. The supply check valve 71 is configured to contact the valve seat surface 44. The stopper surface 54 is formed at a location where the stopper surface 54 is opposed to the opening of the supply passage 401. The stopper surface 54 is configured to limit the radial deformation of the supply check valve 71 when the supply check valve 71 contacts the stopper surface 54.

In the present embodiment, by forming the stopper surface 54 in the above described manner, the deformation of the supply check valve 71 can be limited without interfering the flow of the hydraulic oil.

Furthermore, in the present embodiment, the axial passage 502 has the valve seat step surface 45. The valve seat step surface 45 is located on the axial side of the valve seat surface 44 where the other end portion of the axial passage 502 is placed while the valve seat step surface 45 is located on the radial side of the valve seat surface 44 where the radially inner side of the outer sleeve 40 is placed. Therefore, the advantages, which are similar to those of the first embodiment, can be achieved.

Furthermore, in the present embodiment, the axial passage 502 has the stopper step surface 43 that is located on the axial side of the stopper surface 42 where the other end portion of the axial passage 502 is placed while the stopper step surface 43 is located on the radial side of the stopper surface 42 where the radially outer side of the outer sleeve 40 is placed. Therefore, the advantages, which are similar to those of the first embodiment, can be achieved.

Third Embodiment

FIG. 12 shows a portion of a hydraulic oil control valve according to a third embodiment. The third embodiment differs from the second embodiment with respect to the configuration of the inner sleeve 50.

The second embodiment further includes a plurality of valve-closing assist passages 509. Each of the valve-closing assist passages 509 extends through the inner sleeve 50 in the radial direction such that one end portion of the valve-closing assist passage 509 opens at the stopper surface 54. The hydraulic oil of the supply passage 601 can flow into the valve-closing assist passage 509.

In the present embodiment, when a back flow of the hydraulic oil is generated in the state where the inner wall of the supply check valve 71 contacts the stopper surface 54 upon urging of the outer wall of the supply check valve 71 by the hydraulic oil, the inner wall of the supply check valve 71 is urged by the hydraulic oil in the valve-closing assist passages 509, so that the supply check valve 71 is deformed toward the radially outer side and is thereby closed. As discussed above, the valve-closing assist passages 509 assist the valve closing of the supply check valve 71.

As discussed above, the present embodiment further includes the valve-closing assist passages 509. Each of the valve-closing assist passages 509 extends through the inner sleeve 50 in the radial direction such that the one end portion of the valve-closing assist passage 509 opens at the stopper surface 54, and the hydraulic oil can flow into the inside of the valve-closing assist passage 509. The valve-closing assist passages 509 can assist the valve closing of the supply check valve 71.

Fourth Embodiment

FIG. 13 shows a hydraulic oil control valve according to a fourth embodiment. The fourth embodiment differs from the second embodiment with respect to the configuration of the inner sleeve 50.

In the fourth embodiment, the inner sleeve 50 includes a first inner sleeve 511 and a second inner sleeve 512.

The first inner sleeve 511 is shaped in a substantially cylindrical tubular form and is made of a material, such as resin, which has a relatively low hardness. Specifically, the first inner sleeve 511 is made of the material that has the hardness, which is lower than the hardness of the outer sleeve 40.

The second inner sleeve 512 is shaped in a substantially cylindrical tubular form and is made of a material, which includes, for example, iron and has a relatively high hardness. Specifically, the second inner sleeve 512 is made of the material that has the hardness, which is higher than the hardness of the first inner sleeve 511.

The first inner sleeve 511 is placed at the inside of the outer sleeve 40 such that an outer peripheral wall of the first inner sleeve 511 is fitted to the inner peripheral wall of the outer sleeve 40. The first inner sleeve 511 is immovable relative to the outer sleeve 40.

The second inner sleeve 512 is placed at the inside of the first inner sleeve 511 such that an outer peripheral wall of the second inner sleeve 512 is fitted to an inner peripheral wall of the first inner sleeve 511. The second inner sleeve 512 is immovable relative to the first inner sleeve 511.

A plurality of axial passages 502 is formed to extend in the axial direction at a location between the outer sleeve 40 and the first inner sleeve 511.

Each of the axial passages 502 is formed at a fitting interface T1 between the outer sleeve 40 and the first inner sleeve 511 such that the axial passage 502 is radially inwardly recessed from the outer peripheral wall of the first inner sleeve 511.

A plurality of radial passages 504 extends through the second inner sleeve 512 in the radial direction. One end portion of each of the radial passages 504 is connected to the other end portion of the corresponding axial passage 502, and the other end portion of the radial passage 504 is connected to a space at the inside of the inner sleeve 50 (see FIG. 13).

In the fourth embodiment, the movement limiting portions 56, 57 are formed at the first inner sleeve 511. Furthermore, the sleeve plate 51 is formed integrally in one piece with the first inner sleeve 511 such that the sleeve plate 51 closes one end portion of the first inner sleeve 511.

In the fourth embodiment, the valve seat step surface 45 and the stopper step surface 55 are not formed.

As described above, in the present embodiment, the outer sleeve 40 has the threaded portion 41 formed at the outer peripheral wall of the outer sleeve 40 while the threaded portion 41 is threadably engageable with the inner wall of the valve timing adjustment device 10.

The inner sleeve 50 includes the first inner sleeve 511 and the second inner sleeve 512. The first inner sleeve 511 is shaped in the tubular form and is made of the material, which has the hardness that is lower than the hardness of the outer sleeve 40. The second inner sleeve 512 is shaped in the tubular form and is placed at the inside of the first inner sleeve 511. The second inner sleeve 512 is made of the material that has the hardness, which is higher than the hardness of the first inner sleeve 511. The axial passages 502 are formed at the first inner sleeve 511. In the present embodiment, the axial passages 502 and the movement limiting portions 56, 57 are formed at the first inner sleeve 511 that has the hardness, which is lower than the hardness of the outer sleeve 40. Accordingly, the axial passages 502 and the movement limiting portions 56, 57 can be easily and accurately formed at the first inner sleeve 511 by, for example, cutting while a required strength of the threaded portion 41 of the outer sleeve 40 is ensured.

Furthermore, the second inner sleeve 512, which has the hardness higher than the hardness of the first inner sleeve 511, is shaped in the substantially cylindrical tubular form that is a simple form, Therefore, the second inner sleeve 512 can be easily formed although the hardness of the second inner sleeve 512 is high.

Furthermore, it is possible to ensure the required strength of the second inner sleeve 512 that has the inner wall, along which the outer wall of the spool 60 is slid.

Furthermore, in the present embodiment, the outer sleeve 40 is made of the material that includes iron. The first inner sleeve 511 is made of the resin. The second inner sleeve 512 is made of the material that includes iron. This specifically exemplifies the configurations of the outer sleeve 40, the first inner sleeve 511 and the second inner sleeve 512. With these configurations, the axial passages 502 can be easily formed at the first inner sleeve 511 while ensuring the required strength of the outer sleeve 40 and the second inner sleeve 512.

Fifth Embodiment

FIGS. 14 and 15 show a portion of a hydraulic oil control valve according to a fifth embodiment. The fifth embodiment differs from the first embodiment with respect to the configuration of the supply check valve.

In the fifth embodiment, similar to the supply check valve 71 of the first embodiment, the supply check valve 72 is formed by rolling a rectangular metal thin plate such that a longitudinal direction of the rectangular metal thin plate coincides with the circumferential direction, so that the supply check valve 72 is shaped in a substantially cylindrical tubular form. FIG. 14 is a developed view of the supply check valve 72. FIG. 15 is a cross-sectional view of the supply check valve 72 at an intermediate position thereof in the axial direction.

In the fifth embodiment, the supply check valve 72 includes an overlap portion 700, a plurality of openings 720, a plurality of support portions 721, and a plurality of valve portions 701.

The overlap portion 700 is formed at one circumferential end portion of the supply check valve 72. The overlap portion 700 is formed to overlap with a radially outer side of the other circumferential end portion of the supply check valve 72 (see FIG. 15).

Here, the number of the openings 720 is four, and these openings 720 are arranged one after the other at equal intervals in the circumferential direction of the supply check valve 72.

Each of the support portions 721 extends from an inner edge part of a corresponding one of the four openings 720 in the circumferential direction of the supply check valve 72.

Each valve portion 701 is connected to a distal end part of the corresponding support portion 721. Here, the number of the valve portions 701 is four, and these valve portions 701 are arranged one after the other at equal intervals in the circumferential direction of the supply check valve 72.

The supply check valve 72 is placed at the circumferential passage 503. The supply check valve 72 is placed at the one end portions of the axial passage 502 and the circumferential passage 503 such that the support portions 721 and the valve portions 701 are resiliently deformable in the radial direction. Here, the supply check valve 72 is formed such that the four valve portions 701 respectively correspond to the four supply passages 501. Specifically, the supply check valve 72 is located on a radial side of the supply passages 501 where the radially outer side of the inner sleeve 50 is placed.

Sixth Embodiment

FIGS. 16 and 17 show a portion of a hydraulic oil control valve according to a sixth embodiment. The sixth embodiment differs from the first embodiment with respect to the configuration of the supply check valve.

In the sixth embodiment, similar to the supply check valve 71 of the first embodiment, the supply check valve 73 is formed by rolling a rectangular metal thin plate such that a longitudinal direction of the rectangular metal thin plate coincides with the circumferential direction, so that the supply check valve 73 is shaped in a substantially cylindrical tubular form. FIG. 16 is a developed view of the supply check valve 73. FIG. 17 is a view of the supply check valve 73 taken in the axial direction.

In the sixth embodiment, the supply check valve 73 includes the overlap portion 700, the valve portions 701 and the cutouts 731.

The overlap portion 700 is formed at one circumferential end portion of the supply check valve 73. The overlap portion 700 is formed to overlap with a radially outer side of the other circumferential end portion of the supply check valve 73 (see FIG. 17). Here, the number of the valve portions 701 is four, and these valve portions 701 are arranged one after the other at equal intervals in the circumferential direction of the supply check valve 73.

The cutouts 731 are formed at two opposite axial end parts of the supply check valve 73 by axially cutting the opposite axial end parts of the supply check valve 73. The plurality of the cutouts 731 is spaced from each other in the circumferential direction of the supply check valve 73.

The supply check valve 73 is placed at the circumferential passage 503. The supply check valve 73 is placed at the one end portion of the axial passage 502 and the circumferential passage 503 such that the supply check valve 73 is resiliently deformable in the radial direction. Here, the supply check valve 73 is formed such that the four valve portions 701 respectively correspond to the four supply passages 501. Specifically, the supply check valve 73 is located on the radial side of the supply passages 501 where the radially outer side of the inner sleeve 50 is placed.

When the supply check valve 73 is deformed such that the supply check valve 73 radially outwardly expands, i.e., the inner diameter of the supply check valve 73 is increased, the overlap portion 700 is spaced away from the other circumferential end portion of the supply check valve 73.

When the supply check valve 73 is radially outwardly deformed or is radially inwardly deformed, the hydraulic oil can flow through the cutouts 731. Therefore, particularly, the radial deformation of the supply check valve 73 is less likely interfered by the hydraulic oil, which is present around the end portion of the supply check valve 73 located on the movement limiting portion 57 side. As a result, the smooth operation of the opening/closing valve portions of the supply check valve 73 can be promoted.

Seventh Embodiment

FIGS. 18 and 19 show a portion of a hydraulic oil control valve according to a seventh embodiment. The seventh embodiment differs from the second embodiment with respect to the configurations of the outer sleeve 40, the inner sleeve 50 and the supply check valve.

In the seventh embodiment, the number of the supply passages 401 is two, and these two supply passages 401 are arranged one after the other at equal intervals in the circumferential direction of the outer sleeve 40 (see FIGS. 18 and 19). The supply passages 401 conduct the hydraulic oil supplied from the oil pump 8.

A plurality of axial passages 502 is formed between the outer sleeve 40 and the inner sleeve 50 and extends in the axial direction.

Each of the axial passages 502 is formed at a fitting interface T1 between the outer sleeve 40 and the inner sleeve 50 such that the axial passage 502 is radially inwardly recessed from the outer peripheral wall of the inner sleeve 50.

In the present embodiment, the number of the axial passages 502 is two, and these two axial passages 502 are arranged one after the other at equal intervals in the circumferential direction of the inner sleeve 50 (see FIGS. 18 and 19).

Each of the two supply passages 401 connects between one end portion of the corresponding one of two axial passages 502 and the outside of the outer sleeve 40. Specifically, each of the supply passages 401 opens to the one end portion of the corresponding one of the axial passages 502.

In the seventh embodiment, the circumferential passage 503 discussed in the second embodiment is not formed.

A plurality of radial passages 504 extends through the inner sleeve 50 in the radial direction. One end portion of each of the radial passages 504 is connected to the other end portion of the corresponding axial passage 502, and the other end portion of the radial passage 504 is connected to the space at the inside of the inner sleeve 50 (see FIG. 18). The number of the radial passages 504 is two, and the two radial passages 504 are connected to the two axial passages 502, respectively (see FIG. 18).

For example, each of a plurality of supply check valves 74 is formed by alternately folding a rectangular metal thin plate back and forth in a longitudinal direction of the rectangular metal thin plate.

Each of the supply check valves 74 is placed at the one end portion of the corresponding axial passage 502. The supply check valve 74 is installed at the one end portion of the axial passage 502 such that the supply check valve 74 is resiliently deformable in the radial direction of the inner sleeve 50. Here, the number of the supply check valves 74 is two to respectively correspond to the two supply passages 401. Specifically, the supply check valve 74 is located on the radial side of the supply passage 401 where the radially inner side of the outer sleeve 40 is placed.

The supply check valve 74 has a force to expand toward the radially outer side of the inner sleeve 50. Therefore, the supply check valve 74 abuts against the valve seat surface 44 and closes the corresponding supply passage 401.

In the seventh embodiment, the valve seat step surface 45 and the stopper step surface 55 discussed in the second embodiment are not formed.

When the hydraulic oil flows to the axial passage 502 through the supply passage 401, the supply check valve 74 is deformed such that the supply check valve 74 is urged by the hydraulic oil and is deformed to shrink toward the radially inner side of the inner sleeve 50. In this way, the supply check valve 74 is spaced away from the valve seat surface 44, so that the hydraulic oil can flow toward the other end portion of the axial passage 502, i.e., toward the radial passage 504 through a gap between the supply check valve 74 and the valve seat surface 44.

When a flow rate of the hydraulic oil flowing through the supply passage 401 becomes lower than or equal to a predetermined value, the supply check valve 74 is deformed to expand toward the radially outer side of the inner sleeve 50. Thereby, the supply check valve 74 contacts the valve seat surface 44 and is thereby closed. In this way, the flow of the hydraulic oil from the axial passage 502 toward the supply passage 401 is limited.

As discussed above, the supply check valve 74 functions as the check valve such that the supply check valve 74 enables the flow of the hydraulic oil from the supply passage 401 toward the axial passage 502 and limits the flow of the hydraulic oil from the axial passage 502 toward the supply passage 401.

The movement limiting portion 56 is placed on the side of the supply check valve 74, which is opposite to the retaining portion 59. The movement limiting portion 56 can limit the movement of the supply check valve 74 toward the opposite side that is opposite to the retaining portion 59 in the axial direction of the inner sleeve 50 when the movement limiting portion 56 contacts the supply check valve 74.

The movement limiting portion 57 is placed on the side of the supply check valve 74 where the retaining portion 59 is placed. The movement limiting portion 57 can limit the movement of the supply check valve 74 toward the retaining portion 59 in the axial direction of the inner sleeve 50 when the movement limiting portion 57 contacts the supply check valve 74.

As described above, the movement limiting portions 56, 57 can limit the movement of the supply check valve 74 in the axial direction of the inner sleeve 50 to limit displacement of the supply check valve 74 away from the supply passage 401. Furthermore, the movement limiting portion 56 can limit the movement of the supply check valve 74 toward the other side of the axial passage 502 to limit closing of the radial passage 504 by the supply check valve 74.

Other Embodiments

In the above embodiments, the movement limiting portion 56 and the movement limiting portion 57 are described such that the movement limiting portion 56 limits the axial movement of the supply check valve toward the retaining portion 59, i.e., the axial movement of the supply check valve toward the other end portion of the axial passage 502, and the movement limiting portion 57 limits the axial movement of the supply check valve toward the opposite side, which is opposite to the retaining portion 59, i.e., the axial movement of the supply check valve toward the side that is opposite to the other end portion of the axial passage 502. Alternatively, in another embodiment of the present disclosure, only one of the movement limiting portion 56 and the movement limiting portion 57 may be formed. Further alternatively, both of the movement limiting portion 56 and the movement limiting portion 57 may be eliminated. Furthermore, in another embodiment of the present disclosure, the valve seat step surface and the stopper step surface may be eliminated.

Furthermore, in the above embodiments, there is described the example where the radial passages 504 extend through the inner sleeve 50 in the radial direction. Alternatively, in another embodiment of the present disclosure, the radial passages 504 may be formed to extend through the outer sleeve 40 in the radial direction. In this case, the end portion of each radial passage 504, which is opposite to the axial passage 502, may be directly connected to the hydraulic oil supply subject while bypassing the inside of the inner sleeve 50.

Furthermore, in the above embodiments, there is described the example where the axial passage 502 is formed at the fitting interface T1 between the outer sleeve 40 and the inner sleeve 50 such that the axial passage 502 is radially inwardly recessed from the outer peripheral wall of the inner sleeve 50. Alternatively, in another embodiment of the present disclosure, the axial passage 502 may be formed at the fitting interface T1 between the outer sleeve 40 and the inner sleeve 50 such that the axial passage 502 is radially outwardly recessed from the inner peripheral wall of the outer sleeve 40.

Furthermore, in the first to third and seventh embodiments, there is described the example where the outer sleeve 40 is made of the material including iron, and the inner sleeve 50 is made of the material including aluminum. Alternatively, in another embodiment of the present disclosure, the inner sleeve 50 may be made of any other material as long as such a material has the hardness that is lower than the harness of the outer sleeve 40. Furthermore, the outer sleeve 40 may be made of any other material as long as such a material has the hardness that is higher than the hardness of the inner sleeve 50.

In the fourth embodiment, there is described the example where the outer sleeve 40 is made of the material including iron, and the first inner sleeve 511 is made of resin, and the second inner sleeve 512 is made of the material including iron. Alternatively, in another embodiment of the present disclosure, the first inner sleeve 511 may be made of any other material as long as such a material has the hardness that is lower than the hardness of the outer sleeve 40 and the hardness of the second inner sleeve 512. Furthermore, the outer sleeve 40 may be made of any other material as long as such a material has the hardness that is higher than the hardness of the first inner sleeve 511. Furthermore, the second inner sleeve 512 may be made of any other material as long as such a material has the hardness that is higher than the hardness of the first inner sleeve 511.

Furthermore, in another embodiment of the present disclosure, the hydraulic oil control valve 11 is not necessarily placed at the center of the vane rotor 30 and may be placed at the outside of the valve timing adjustment device 10. In such a case, the threaded portion 41 may be eliminated from the outer sleeve 40. Also, in this case, both of the outer sleeve 40 and the inner sleeve 50 may be made of a material that includes aluminum. In such a case, the material cost of the outer sleeve 40 and the inner sleeve 50 can be reduced while the required strength of the outer sleeve 40 and the inner sleeve 50 is ensured.

Furthermore, in another embodiment of the present disclosure, the outer sleeve 40 and the inner sleeve 50 may not include the primary control port 411 and the secondary control port 412, and the spool 60 may be eliminated. In such a case, the radial passage 504 may be formed at the outer sleeve 40, or the axial passage 502 may open at an axial end surface of the outer sleeve 40 and an axial end surface of the inner sleeve 50 and may be connected to the hydraulic oil supply subject.

Furthermore, the hydraulic oil control valve 11 of the present disclosure is not necessarily applied to the valve timing adjustment device 10, which includes the two types of hydraulic chambers, i.e., the retard chambers 201 and the advance chambers 202. For example, the hydraulic oil control valve 11 of the present disclosure may be used to control the hydraulic oil to be supplied to another type of device that is driven by the hydraulic oil.

Furthermore, in another embodiment of the present disclosure, the housing 20 and the crankshaft 2 may be connected by a transmission member, such as a belt, in place of the chain 6.

In the above embodiments, there is described the example where the crankshaft 2 serves as the first shaft, and the camshaft 3 serves as the second shaft. Alternatively, in another embodiment of the present disclosure, the crankshaft 2 may serve as the second shaft, and the camshaft 3 may serve as the first shaft. Specifically, the vane rotor 30 may be fixed to the end portion of the crankshaft 2, and the housing 20 may be rotated synchronously with the camshaft 3.

The valve timing adjustment device 10 of the present disclosure may adjust the valve timing of the exhaust valves 5 of the engine 1.

As discussed above, the present disclosure is not limited to the above embodiments and can be implemented in various forms without departing from the scope thereof.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A hydraulic oil control valve configured to control a flow of hydraulic oil to be supplied from a hydraulic oil supply source to a hydraulic oil supply subject, the hydraulic oil control valve comprising:

an outer sleeve that is shaped in a tubular form;
an inner sleeve that is shaped in a tubular form and is placed at an inside of the outer sleeve;
a supply passage that extends through the inner sleeve or the outer sleeve in a radial direction, wherein the supply passage is configured to conduct the hydraulic oil that is supplied from the hydraulic oil supply source;
an axial passage that is located between the outer sleeve and the inner sleeve and extends in an axial direction, wherein the supply passage opens to one end portion of the axial passage while another end portion of the axial passage is configured to connect with the hydraulic oil supply subject; and
a supply check valve that is installed in the axial passage and is located on a radial side of the supply passage where a radially outer side of the inner sleeve or a radially inner side of the outer sleeve is placed, wherein:
the supply check valve is configured to enable a flow of the hydraulic oil from the supply passage toward the axial passage and is configured to limit a flow of the hydraulic oil from the axial passage toward the supply passage;
the supply check valve is shaped in a tubular form and is resiliently deformable in the radial direction;
when the supply check valve is opened and is seated against a valve seat surface formed around the opening of the supply passage, the hydraulic oil flows from the supply passage to the axial passage through a space, which is formed between an opening of the supply passage and the supply check valve in the radial direction and directly opens to the axial passage in the axial direction;
one of an inner peripheral wall of the outer sleeve and an outer peripheral wall of the inner sleeve forms a stopper surface that circumferentially extends all along the supply check valve on a radially opposite side of the supply check valve which is opposite to the opening of the supply passage in the radial direction to limit further radial deformation of the supply check valve when the supply check valve is radially deformed away from the opening of the supply passage and contacts the stopper surface;
in a cross-section of the hydraulic oil control valve, which is parallel to an axis of the hydraulic oil control valve, the stopper surface extends continuously without interruption in the axial direction and has an axial length which is measured in the axial direction and is more than one half of an axial length of the supply check valve measured in the axial direction;
the one of the inner peripheral wall of the outer sleeve and the outer peripheral wall of the inner sleeve has a stopper step surface which is radially recessed from the stopper surface in a direction away from the valve seat surface and is axially located on one axial side of the stopper surface, at which the another end portion of the axial passage is placed in the axial direction;
in a state where the supply check valve contacts the stopper surface, a gap is radially formed between the stopper step surface and one axial end portion of the supply check valve, which is axially located on the one axial side of the stopper surface; and
the supply check valve is configured to be radially deformed in a direction away from the stopper surface toward the valve seat surface when a backflow of the hydraulic oil, which flows in the axial passage from the another end portion of the axial passage toward the one end portion of the axial passage, is supplied into the gap.

2. The hydraulic oil control valve according to claim 1, further comprising a movement limiting portion that is configured to limit movement of the supply check valve in the axial direction.

3. The hydraulic oil control valve according to claim 1, further comprising a circumferential passage that is shaped in an annular form and extends from the one end portion of the axial passage in a circumferential direction at a location that is between the outer sleeve and the inner sleeve, wherein:
the supply check valve is placed at the one end portion of the axial passage and the circumferential passage such that the supply check valve is resiliently deformable in the radial direction.

4. The hydraulic oil control valve according to claim 3, wherein the axial passage has a valve seat step surface that is located on an axial side of the valve seat surface where the another end portion of the axial passage is placed, and the valve seat step surface is located on a radial side of the valve seat surface where a radially outer side of the inner sleeve or a radially inner side of the outer sleeve is placed.

5. The hydraulic oil control valve according to claim 1, wherein a boundary between the stopper surface and the stopper step surface is located within an axial extent of the supply check valve.

6. A hydraulic oil control valve configured to control a flow of hydraulic oil to be supplied from a hydraulic oil supply source to a hydraulic oil supply subject, the hydraulic oil control valve comprising:
an outer sleeve that is shaped in a tubular form;
an inner sleeve that is shaped in a tubular form and is placed at an inside of the outer sleeve;
a supply passage that extends through the inner sleeve or the outer sleeve in a radial direction, wherein the supply passage is configured to conduct the hydraulic oil that is supplied from the hydraulic oil supply source;
an axial passage that is located between the outer sleeve and the inner sleeve and extends in an axial direction, wherein the supply passage opens to one end portion of the axial passage while another end portion of the axial passage is configured to connect with the hydraulic oil supply subject; and
a supply check valve that is installed in the axial passage and is located on a radial side of the supply passage where a radially outer side of the inner sleeve or a radially inner side of the outer sleeve is placed, wherein:
the supply check valve is configured to enable a flow of the hydraulic oil from the supply passage toward the axial passage and is configured to limit a flow of the hydraulic oil from the axial passage toward the supply passage;
the supply check valve is shaped in a tubular form and is resiliently deformable in the radial direction;
when the supply check valve is opened, the hydraulic oil flows from the supply passage to the axial passage through a space, which is formed between an opening of the supply passage and the supply check valve in the radial direction and directly opens to the axial passage in the axial direction;
the hydraulic oil control valve further comprises:
a circumferential passage that is shaped in an annular form and extends from the one end portion of the axial passage in a circumferential direction at a location that is between the outer sleeve and the inner sleeve, wherein:
the supply check valve is placed at the one end portion of the axial passage and the circumferential passage such that the supply check valve is resiliently deformable in the radial direction; and
the axial passage has:
a valve seat surface that is formed around the opening of the supply passage, wherein the supply check valve is configured to contact the valve seat surface; and
a stopper surface that is formed at a location where the stopper surface is opposed to the opening of the supply passage, wherein the stopper surface is configured to limit radial deformation of the supply check valve when the supply check valve contacts the stopper surface; and
a valve-closing assist passage that extends through the inner sleeve or the outer sleeve in the radial direction, wherein one end portion of the valve-closing assist passage opens through the stopper surface in the radial direction and is opposed to the supply passage in the radial direction, and the valve-closing assist passage is configured to enable inflow of the hydraulic oil into an inside of the valve-closing assist passage.

7. The hydraulic oil control valve according to claim 1, further comprising a radial passage that extends through the inner sleeve or the outer sleeve in the radial direction, wherein one end portion of the radial passage is connected to the another end portion of the axial passage, and another end portion of the radial passage is configured to connect with the hydraulic oil supply subject.

8. The hydraulic oil control valve according to claim 1, wherein:
the inner peripheral wall of the outer sleeve is in a form of a cylindrical surface;
the outer peripheral wall of the inner sleeve is in a form of a cylindrical surface; and
the axial passage is formed at a fitting boundary between the outer sleeve and the inner sleeve such that the axial passage is radially inwardly recessed from the outer peripheral wall of the inner sleeve or is radially outwardly recessed from the inner peripheral wall of the outer sleeve.

9. The hydraulic oil control valve according to claim 8, wherein:
the outer sleeve has a threaded portion formed at an outer peripheral wall of the outer sleeve while the threaded portion is configured to threadably engage with an inner wall of the hydraulic oil supply subject;
the inner sleeve is made of a material that has a hardness, which is lower than a hardness of the outer sleeve; and
the axial passage is formed at the inner sleeve.

10. The hydraulic oil control valve according to claim 9, wherein:
the outer sleeve is made of a material that include iron; and
the inner sleeve is made of a material that includes aluminum.

11. A hydraulic oil control valve configured to control a flow of hydraulic oil to be supplied from a hydraulic oil supply source to a hydraulic oil supply subject, the hydraulic oil control valve comprising:
an outer sleeve that is shaped in a tubular form;

an inner sleeve that is shaped in a tubular form and is placed at an inside of the outer sleeve;

a supply passage that extends through the inner sleeve or the outer sleeve in a radial direction, wherein the supply passage is configured to conduct the hydraulic oil that is supplied from the hydraulic oil supply source;

an axial passage that is located between the outer sleeve and the inner sleeve and extends in an axial direction, wherein the supply passage opens to one end portion of the axial passage while another end portion of the axial passage is configured to connect with the hydraulic oil supply subject; and a supply check valve that is installed in the axial passage and is located on a radial side of the supply passage where a radially outer side of the inner sleeve or a radially inner side of the outer sleeve is placed, wherein:

the supply check valve is configured to enable a flow of the hydraulic oil from the supply passage toward the axial passage and is configured to limit a flow of the hydraulic oil from the axial passage toward the supply passage;

the supply check valve is shaped in a tubular form and is resiliently deformable in the radial direction;

when the supply check valve is opened, the hydraulic oil flows from the supply passage to the axial passage through a space, which is formed between an opening of the supply passage and the supply check valve in the radial direction and directly opens to the axial passage in the axial direction;

an inner peripheral wall of the outer sleeve is in a form of a cylindrical surface;

an outer peripheral wall of the inner sleeve is in a form of a cylindrical surface;

the axial passage is formed at a fitting boundary between the outer sleeve and the inner sleeve such that the axial passage is radially inwardly recessed from the outer peripheral wall of the inner sleeve or is radially outwardly recessed from the inner peripheral wall of the outer sleeve;

the outer sleeve has a threaded portion formed at an outer peripheral wall of the outer sleeve while the threaded portion is configured to threadably engage with an inner wall of the hydraulic oil supply subject;

the inner sleeve includes:
a first inner sleeve that is shaped in a tubular form and is made of a material, which has a hardness that is lower than a hardness of the outer sleeve; and
a second inner sleeve that is shaped in a tubular form and is placed at an inside of the first inner sleeve, wherein the second inner sleeve is made of a material that has a hardness, which is higher than the hardness of the first inner sleeve; and the axial passage is formed at the first inner sleeve.

12. The hydraulic oil control valve according to claim 11, wherein:
the outer sleeve is made of a material that includes iron;
the first inner sleeve is made of resin; and
the second inner sleeve is made of a material that includes iron.

13. The hydraulic oil control valve according to claim 1, wherein the outer sleeve and the inner sleeve are made of a material that includes aluminum.

14. The hydraulic oil control valve according to claim 1, wherein:

the outer sleeve and the inner sleeve have at least one control port that is configured to connect with the hydraulic oil supply subject;

the hydraulic oil control valve further comprises a spool that is shaped in a tubular form while the spool is configured to reciprocate in the axial direction at an inside of the inner sleeve and forms an inside space at an inside of the spool;

the spool has:
a supply passage, which is configured to connect between the inside space and the another end portion of the axial passage; and
at least one control passage, which is configured to connect between the inside space and the at least one control port; and the spool enables and disables communication between the at least one control passage and the at least one control port depending on a position of the spool relative to the inner sleeve.

15. A valve timing adjustment device that is configured to be installed in a drive force transmission path for transmitting a drive force from a drive shaft to a driven shaft of an internal combustion engine and is configured to adjust a valve timing of a valve that is driven to open and close by the driven shaft, wherein one of the drive shaft and the driven shaft is defined as a first shaft while the other one of the drive shaft and the driven shaft is defined as a second shaft, the valve timing adjustment device comprising:

a housing that is configured to rotate synchronously with the first shaft and is fitted to an end portion of the second shaft, wherein the housing is rotatably supported by the second shaft;

a vane rotor that is fixed to the end portion of the second shaft and includes a vane that partitions a space at an inside of the housing into a plurality of hydraulic chambers, wherein the vane rotor is configured to rotate relative to the housing according to a pressure of hydraulic oil supplied from the hydraulic oil supply source to the plurality of hydraulic chambers; and the hydraulic oil control valve of claim 14, wherein:
the hydraulic oil supply subject is the valve timing adjustment device; and
the at least one control port is connected to the plurality of hydraulic chambers.

16. The valve timing adjustment device according to claim 15, wherein the hydraulic oil control valve is placed at a center of the vane rotor.

17. A hydraulic oil control valve configured to control a flow of hydraulic oil to be supplied from a hydraulic oil supply source to a hydraulic oil supply subject, the hydraulic oil control valve comprising:

an outer sleeve that is shaped in a tubular form;
an inner sleeve that is shaped in a tubular form and is placed at an inside of the outer sleeve;

a supply passage that extends through the inner sleeve or the outer sleeve in a radial direction, wherein the supply passage is configured to conduct the hydraulic oil that is supplied from the hydraulic oil supply source;

an axial passage that is located between the outer sleeve and the inner sleeve and extends in an axial direction, wherein the supply passage opens to one end portion of the axial passage while another end portion of the axial passage is configured to connect with the hydraulic oil supply subject; and a supply check valve that is installed in the axial passage and is located on a radial side of the supply passage where a radially outer side of the inner sleeve or a radially inner side of the outer sleeve is placed, wherein:

the supply check valve is configured to enable a flow of the hydraulic oil from the supply passage toward the axial passage and is configured to limit a flow of the hydraulic oil from the axial passage toward the supply passage;

the supply check valve is shaped in a tubular form and is resiliently deformable in the radial direction;

when the supply check valve is opened, the hydraulic oil flows from the supply passage to the axial passage through a space, which is formed between an opening of the supply passage and the supply check valve in the radial direction and directly opens to the axial passage in the axial direction; and the inner sleeve includes a first inner sleeve and a second inner sleeve that placed at an inside of the first inner sleeve.

* * * * *